United States Patent [19]
Mitsutani

[11] Patent Number: 5,875,628
[45] Date of Patent: Mar. 2, 1999

[54] AIR-FUEL RATIO CONTROL APPARATUS FOR INTERNAL COMBUSTION ENGINE

[75] Inventor: Noritake Mitsutani, Toyota, Japan

[73] Assignee: Toyota Jidosha Kabushiki Kaisha, Toyota, Japan

[21] Appl. No.: 810,111

[22] Filed: Feb. 25, 1997

[30] Foreign Application Priority Data

Feb. 28, 1996 [JP] Japan .................................. 8-041552
Oct. 31, 1996 [JP] Japan .................................. 8-289883

[51] Int. Cl.$^6$ .................................................. F01N 3/00
[52] U.S. Cl. ........................... 60/276; 60/277; 60/285; 123/688
[58] Field of Search ..................... 123/688; 60/276, 60/277, 285

[56] References Cited

U.S. PATENT DOCUMENTS

| | | |
|---|---|---|
| 5,279,116 | 1/1994 | Shimizu et al. . |
| 5,301,501 | 4/1994 | Shimizu et al. . |
| 5,303,548 | 4/1994 | Shimizu et al. . |
| 5,311,737 | 5/1994 | Komatsu et al. ................... 60/285 |
| 5,359,853 | 11/1994 | Shimizu . |
| 5,377,484 | 1/1995 | Shimizu . |
| 5,412,941 | 5/1995 | Suzuki et al. . |
| 5,417,058 | 5/1995 | Shimizu . |
| 5,485,382 | 1/1996 | Seki et al. ......................... 60/276 |
| 5,533,332 | 7/1996 | Uchikawa ........................ 123/688 |

FOREIGN PATENT DOCUMENTS

| | | |
|---|---|---|
| 5-98947 | 4/1993 | Japan . |
| 5-98948 | 4/1993 | Japan . |
| 5-163989 | 6/1993 | Japan . |
| 5-263686 | 10/1993 | Japan . |
| 6-108902 | 4/1994 | Japan . |
| 6-173661 | 6/1994 | Japan . |
| 6-280662 | 10/1994 | Japan . |
| 7-34860 | 2/1995 | Japan . |

*Primary Examiner*—Thomas E. Denion
*Attorney, Agent, or Firm*—Oliff & Berridge PLC

[57] ABSTRACT

In an internal combustion engine in which air-fuel ratio feedback control is performed using an A/F sensor mounted upstream of an exhaust gas purifying catalyst, a deviation in the characteristic of the A/F sensor is estimated and the air-fuel ratio feedback control and catalyst deterioration judging processes are performed accounting for the estimated deviation. If the characteristic of the A/F sensor deviates in an output increasing direction, the amount of fuel correction will become excessively large, and the period from the time an output voltage VAF crosses a target voltage VAFT to the time it returns to the target voltage will become short compared with a normally functioning A/F sensor. On the other hand, if the characteristic of the A/F sensor deviates in an output decreasing direction, the amount of fuel correction will become excessively small, and that period will become long compared with a normally functioning A/F sensor. In the present invention, the output voltage VAF of the A/F sensor is monitored, and its amplitude VP and period CPER are calculated; then, based on the relationship between them, a correction factor K for correcting VAF based on the characteristic deviation is obtained. Instead of the amplitude VP and period CPER, a response curve length and an area enclosed by VAF and VAFT may be used.

7 Claims, 29 Drawing Sheets

Fig. 8

|  | n TIMES BACK | ... | 2 TIMES BACK | PREVIOUS TIME | PRESENT TIME |
|---|---|---|---|---|---|
| ESTIMATED CYLINDER AIR AMOUNT | $MC_n$ | --- | $MC_2$ | $MC_1$ | $MC_0$ |
| TARGET CYLINDER FUEL AMOUNT | $FCR_n$ | --- | $FCR_2$ | $FCR_1$ | $FCR_0$ |

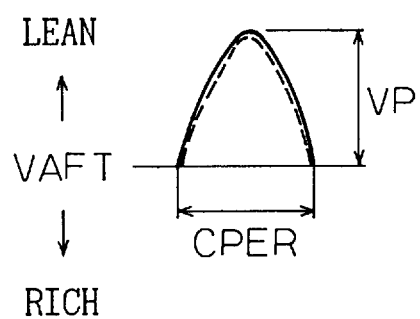
Fig.9A NORMAL
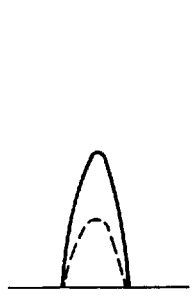
Fig.9B OUTPUT INCREASED
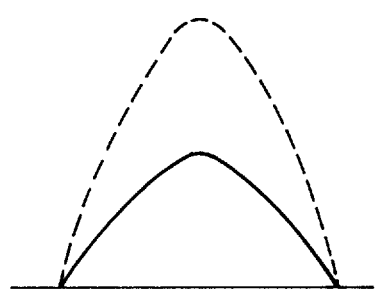
Fig.9C OUTPUT DECREASED
Fig.10
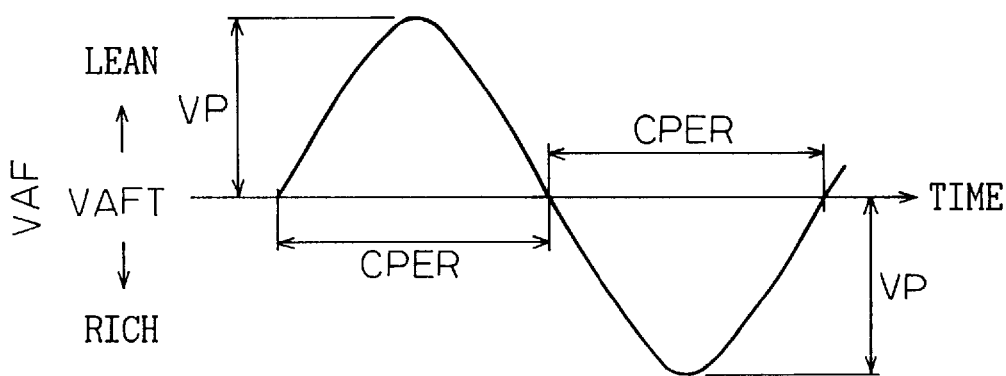

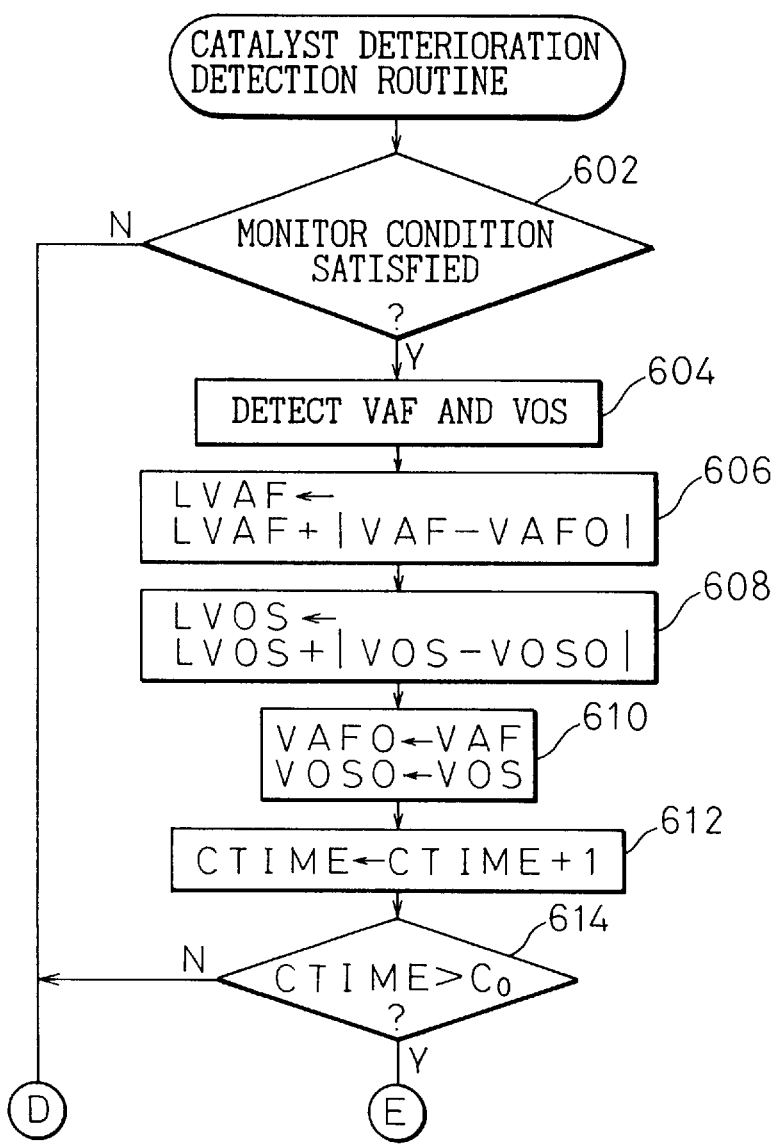

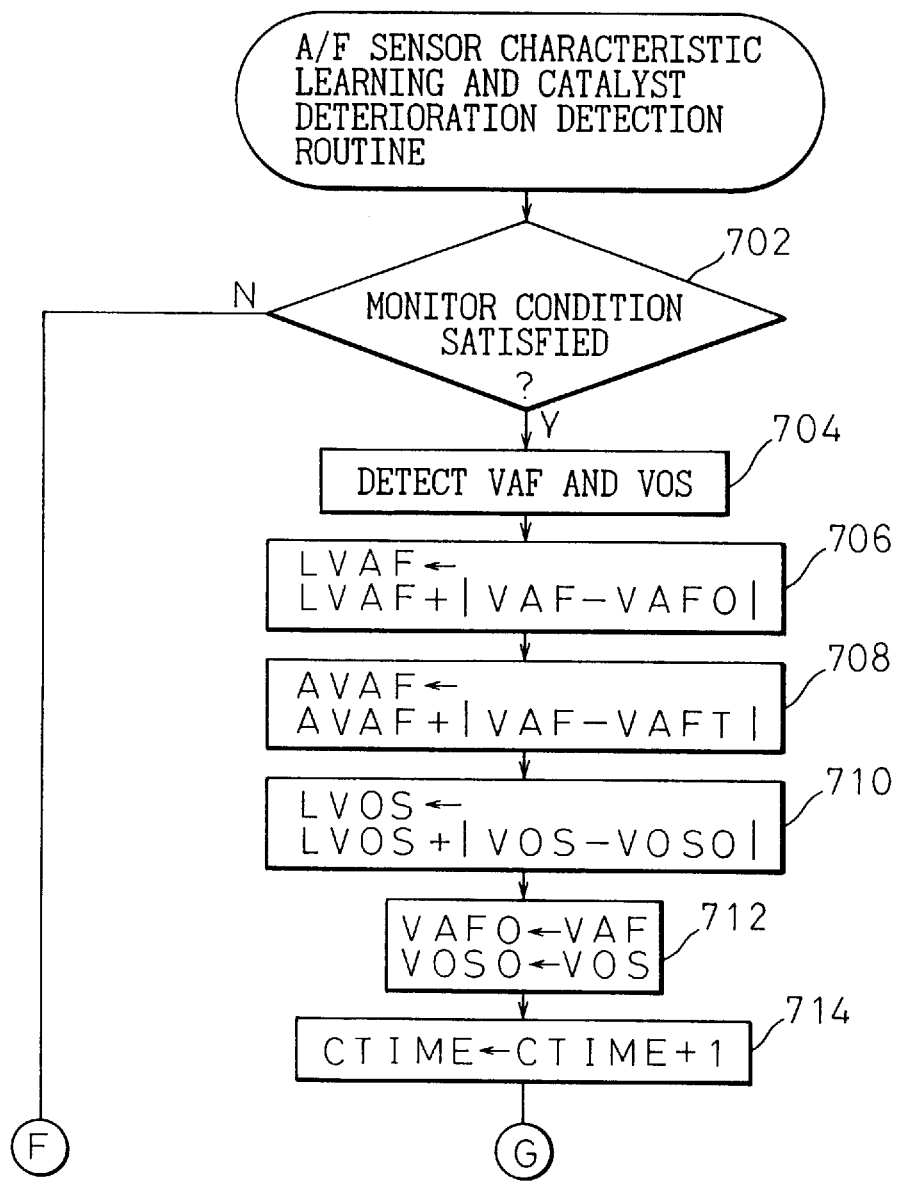

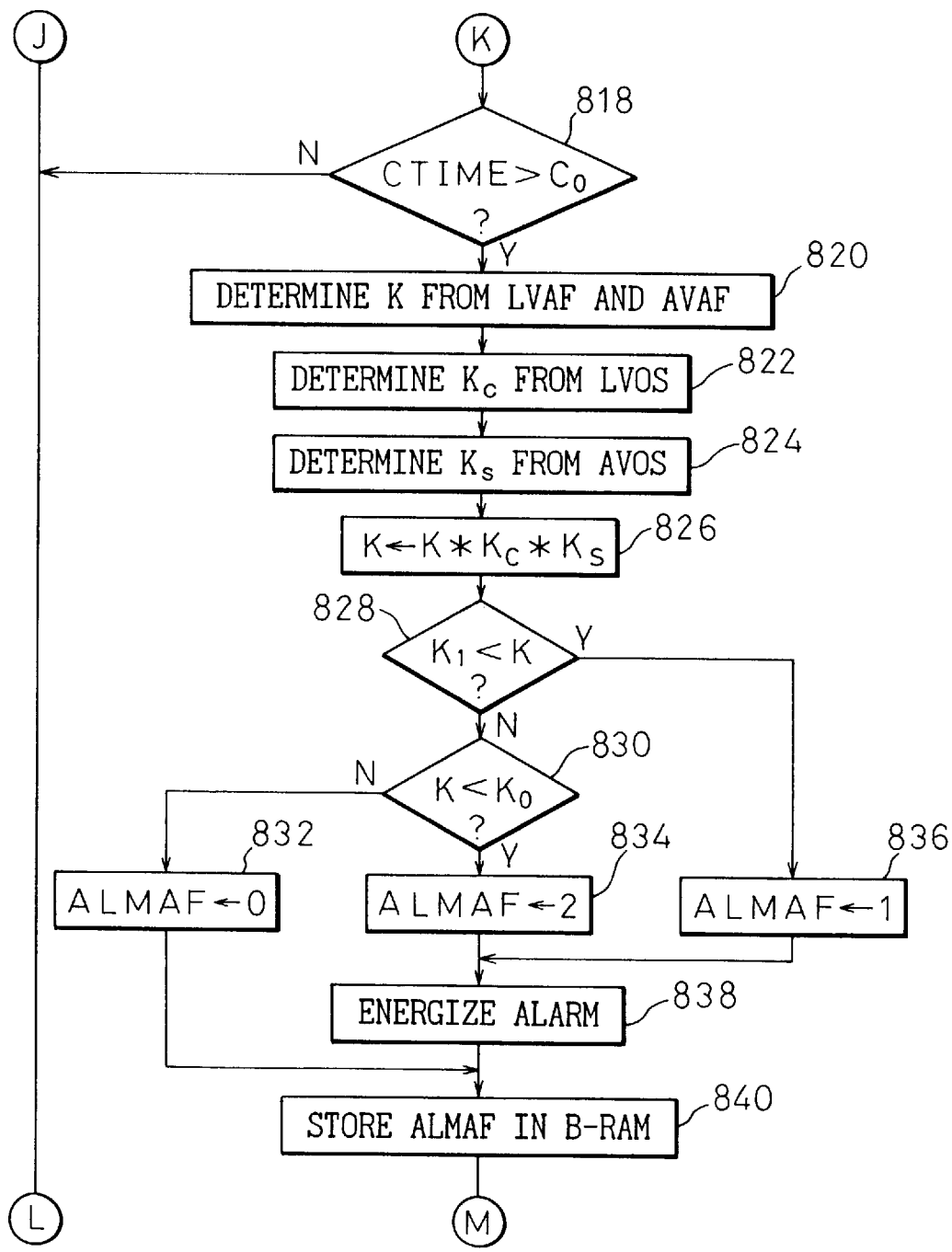

AIR-FUEL RATIO CONTROL APPARATUS FOR INTERNAL COMBUSTION ENGINE

BACKGROUND OF THE INVENTION

1. Field of the Invention

The present invention relates to an air-fuel ratio control apparatus for controlling the mixture ratio of air and fuel (air-fuel ratio: A/F) in an internal combustion engine at a desired value by supplying an appropriate quantity of fuel in accordance with the amount of intake air, and more particularly to an air-fuel ratio control apparatus which performs air-fuel ratio feedback control with an air-fuel ratio sensor (A/F sensor), capable of linearly detecting the air-fuel ratio, mounted upstream of an exhaust gas purifying catalyst.

2. Description of the Related Art

Three-way catalysts for simultaneously promoting the oxidation of unburned constituents (HC and CO) and the reduction of nitrogen oxides ($NO_x$) in automotive exhaust have long been used on automotive engines to control exhaust emissions. For a maximum oxidation/reduction efficiency of the three-way catalyst, the air-fuel ratio (A/F), a measure of engine combustion state, must be controlled within a very narrow range (called the window) centered at stoichiometry. To achieve this, in fuel injection control in an engine, an $O_2$ sensor (oxygen concentration sensor—see FIG. 1) is mounted that detects whether the air-fuel ratio is on the lean side or rich side with respect to stoichiometry on the basis of the concentration of residual oxygen in the exhaust gas, and air-fuel ratio feedback control is performed to correct the quantity of fuel based on the sensor output.

In such an air-fuel ratio feedback control configuration, the $O_2$ sensor for detecting the concentration of oxygen is mounted as close as possible to the combustion chamber, that is, on the upstream side of the catalytic converter. Furthermore, to compensate for variations in the output characteristic of the $O_2$ sensor, a double $O_2$ sensor system having a second $O_2$ sensor on the downstream side of the catalytic converter has also been introduced for commercial use. The principle of this system is based on the fact that, on the downstream side of a catalytic converter, the exhaust gas is thoroughly stirred, and its oxygen concentration is almost in equilibrium by the action of the three-way catalyst; consequently, the output of the downstream $O_2$ sensor changes mildly compared with the upstream $O_2$ sensor, and thus indicates whether the air-fuel mixture as a whole is on the rich side or lean side. In the double $O_2$ sensor system, sub air-fuel ratio feedback control is performed using the $O_2$ sensor downstream of the catalyst in addition to the main air-fuel ratio feedback control by the $O_2$ sensor upstream of the catalyst, and the air-fuel ratio correction factor used in the main air-fuel ratio feedback control is corrected based on the output of the downstream $O_2$ sensor, to accommodate variations in the output characteristic of the upstream $O_2$ sensor and thereby improve the precision of the air-fuel ratio control.

Even when such a precise air-fuel ratio control is performed, if the catalyst deteriorates due to exposure to exhaust gas heat or poisoning by lead and other contaminants, a satisfactory exhaust gas purification performance cannot be obtained. To address this problem, a variety of catalyst deterioration detection devices have been proposed in the prior art. One such device diagnoses the deterioration of the catalyst by detecting a decrease in an $O_2$ storage effect (the function to store excessive oxygen and reuse it for the purification of unburned exhaust emissions) after warmup using an $O_2$ sensor mounted on the downstream side of the catalyst. That is, deterioration of the catalyst leads to a degradation in the purification performance after warmup, and the above device deduces the degradation of the purification performance from a decrease in the $O_2$ storage effect; more specifically, by using an output signal from the downstream $O_2$ sensor, the device obtains response curve length, feedback frequency, etc. and detects the decrease of the $O_2$ storage effect and, hence, the deterioration of the catalyst. For example, Japanese Patent Unexamined Publication No. 5-98948 (corresponding U.S. Pat. No. 5,301,501) discloses a device which obtains the output response curve length of the downstream $O_2$ sensor during feedback control toward stoichiometry, and based on that, detects catalyst deterioration.

On the other hand, recent years have also seen the development of an internal combustion engine in which the air-fuel ratio is controlled so that the three-way catalyst can consistently provide a constant and stable purification performance. That is, the $O_2$ storage capability is such that, when the exhaust gas is in a lean state, excessive oxygen is adsorbed, and when the exhaust gas is in a rich state, the necessary oxygen is released, thereby purifying the exhaust gas; however, such a capability is limited. To make an effective use of the $O_2$ storage capability, therefore, it is important to maintain the amount of oxygen stored in the catalyst at a prescribed level (for example, one-half the maximum oxygen storage amount) so that the next change in the air-fuel ratio of the exhaust gas can be accommodated, whether it is a change to a rich state or a lean state. When the amount of oxygen is maintained in this manner, a consistent $O_2$ adsorption/desorption function can be achieved, thus ensuring a consistent oxidation/reduction performance of the catalyst.

In the internal combustion engine in which the $O_2$ storage amount is controlled to a constant level to maintain the purification performance of the catalyst, an air-fuel ratio (A/F) sensor (see FIG. 2) capable of linearly detecting air-fuel ratio is used, and feedback control (F/B control) is performed based on a proportional-integral operation (PI operation). That is, a feedback fuel correction amount is calculated by Next fuel correction amount=$K_p$*(Present fuel error)+$K_s$*Σ(previous fuel errors)

where

Fuel error=(Fuel amount actually burned in cylinder)−(Target fuel amount in cylinder with intake air at stoichiometry)

Fuel amount actually burned in cylinder=Detected value of air amount/Detected value of air-fuel ratio $K_p$=Proportional gain $K_s$=Integral gain As can be seen from the above equation for the fuel correction amount, the proportional term is the component that acts to maintain the air-fuel ratio at stoichiometry, as in the feedback control using an $O_2$ sensor, while the integral term is the component that acts to eliminate the steady-state error (offset). That is, by the action of the integral term, the $O_2$ storage amount in the catalyst is maintained at a constant level. For example, when a lean gas occurs as a result of abrupt acceleration or the like, the air-fuel ratio is enriched by the action of the integral term, offsetting the effect of the lean gas.

As described above, in the air-fuel ratio feedback control based on the output voltage of the A/F sensor, control is performed in such a manner as to increase the fuel correction amount as the difference between the output voltage and the target voltage (voltage equivalent to stoichiometry) increases; accordingly, if there occurs a deviation in the output characteristic (out of range) or response characteristic of the A/F sensor, it becomes difficult to achieve a desired air-fuel ratio feedback control. For example, as shown in FIG. 3A, if the A/F sensor shows an excessive response, and the fluctuation of the output voltage VAF (indicated by a solid line) of the A/F sensor becomes greater than the fluctuation of the voltage (indicated by a dashed line) that the sensor should indicate in response to the real A/F (the voltage equivalent to real A/F), the fuel correction amount will become larger than originally designed and the time required to return to the stoichiometry equivalent voltage (target voltage), that is, the cycle of the air-fuel ratio fluctuation, will become shorter. Conversely, as shown in FIG. 3B, if the fluctuation of the output voltage VAF (indicated by a solid line) of the A/F sensor becomes smaller than that of the real A/F equivalent voltage (indicated by a dashed line) because of a deterioration of the A/F sensor response, the fuel correction amount will become smaller than originally designed and the cycle of the air-fuel ratio fluctuation will become longer. Accordingly, in air-fuel ratio feedback control using an A/F sensor, it is important that a deviation in the characteristic of the A/F sensor be compensated for to achieve an air-fuel ratio control accuracy of an acceptable level. Furthermore, it is desirable that a notification be made when a deviation or deterioration is detected in the characteristic of the A/F sensor.

In internal combustion engines in which air-fuel ratio feedback control is performed based on the output voltage of an A/F sensor, an $O_2$ sensor may also be provided on the downstream side of the catalyst to perform sub air-fuel ratio feedback control. In the sub air-fuel ratio feedback control, displacements of the output voltage VOS of the $O_2$ sensor from the target voltage VOST are summed and, based on the sum value, the output voltage VAF of the A/F sensor is corrected, thereby bringing VOS close to the target voltage VOST (that is, the center of the air-fuel ratio fluctuation is gradually shifted until the target voltage is reached). In this case also, catalyst deterioration can be detected by detecting a decrease in the catalyst's $O_2$ storage effect using the $O_2$ sensor, as in the double $O_2$ sensor system.

More specifically, when the $O_2$ storage performance drops due to deterioration of the catalyst, the output voltage VOS of the $O_2$ sensor mounted downstream of the catalyst changes in a short cycle; on the other hand, when the catalyst is normally functioning, the output voltage VOS changes only slightly in a longer cycle because of the catalyst's $O_2$ storage effect. In detecting catalyst deterioration based on the response curve length of the $O_2$ sensor output voltage VOS, the response curve length LVOS of the VOS is obtained over a predetermined monitoring period, and when the value exceeds a critical value, the catalyst is judged as being deteriorated. Here, the critical value is determined according to the response curve length LVAF of the A/F sensor output voltage VAF calculated over the same predetermined period, and is made larger as LVAF becomes longer. For example, in FIG. 4, when the point expressed by (LVAF, LVOS) is above the critical value curve shown in the figure, the catalyst is judged as being deteriorated.

However, when the fluctuation of the A/F sensor output voltage VAF (indicated by the solid line) shows a larger value than the actual A/F fluctuation (indicated by the dashed line) because of an excessive response of the A/F sensor, as shown in FIG. 3A, the resulting value will be displaced and indicate point [1] in the normal region in FIG. 4 despite the condition that should indicate point (1) in the abnormal region. In that case, the catalyst is judged as being normal when it should be judged as being abnormal. Conversely, when the fluctuation of the A/F sensor output voltage VAF (indicated by the solid line) shows a smaller value than the actual A/F fluctuation (indicated by the dashed line) because of deterioration of the A/F sensor response, as shown in FIG. 3B, the resulting value will be displaced and indicate point [2] in the abnormal region in FIG. 4 despite the condition that should indicate point (2) in the normal region. In that case, the catalyst is detected as being abnormal when it should be judged as being normal. Therefore, when judging catalyst deterioration also, it is important to compensate for a deviation in the characteristic of the A/F sensor if the accuracy of catalyst deterioration judgement is to be improved.

SUMMARY OF THE INVENTION

In view of the above situation, it is a primary object of the invention to provide an air-fuel ratio control apparatus for an internal combustion engine in which an A/F sensor having an output characteristic substantially proportional to the concentration of oxygen in exhaust gas is mounted upstream of an exhaust gas purifying catalyst, and based on the difference between the air-fuel ratio represented by the output of the A/F sensor and the target air-fuel ratio, feedback control is performed to bring the air-fuel ratio to the target air-fuel ratio, wherein a deviation in the characteristic of the A/F sensor is estimated and the air-fuel ratio feedback control and catalyst deterioration judging processes are performed accounting for the estimated deviation, while at the same time, the deviation or deterioration in the A/F sensor characteristic is judged. It is also an object of the invention to improve the precision of air-fuel ratio control, and hence the exhaust gas purification performance, and thereby contribute to the prevention of air pollution.

To achieve the above objects, according to a first aspect of the present invention, there is provided an air-fuel ratio control apparatus, for an internal combustion engine, comprising: an exhaust gas purifying catalyst mounted in an exhaust passage of the internal combustion engine; an air-fuel ratio sensor mounted upstream of the exhaust gas purifying catalyst and having an output characteristic substantially proportional to oxygen concentration in exhaust gas; air-fuel ratio feedback control means for performing feedback control so as to bring air-fuel ratio to a target air-fuel ratio on the basis of a difference between an output of the air-fuel ratio sensor and a target output corresponding to the target air-fuel ratio; and sensor output correcting means for calculating an amplitude of the output of the air-fuel ratio sensor, measured in reference to the target output, and a period from the time the output of the air-fuel ratio sensor crosses the target output to the time the output returns to the target output, each time an inversion occurs in the output of the air-fuel ratio sensor with respect to the target output during the air-fuel ratio feedback control being performed by the air-fuel ratio feedback control means, and for correcting the output of the air-fuel ratio sensor on the basis of the amplitude and the period.

According to a second aspect of the present invention, there is provided an air-fuel ratio control apparatus for an internal combustion engine, comprising: an exhaust gas purifying catalyst mounted in an exhaust passage of the internal combustion engine; an air-fuel ratio sensor mounted upstream of the exhaust gas purifying catalyst and having an output characteristic substantially proportional to the oxygen concentration in exhaust gas; air-fuel ratio feedback control means for performing feedback control so as to bring an air-fuel ratio to a target air-fuel ratio on the basis of a difference between an output of the air-fuel ratio sensor and a target output corresponding to the target air-fuel ratio; and sensor fault judging means for calculating an amplitude of the output of the air-fuel ratio sensor, measured with reference to the target output, and a period from the time the output of the air-fuel ratio sensor crosses the target output to the time the output returns to the target output, each time an inversion occurs in the output of the air-fuel ratio sensor with respect to the target output during the air-fuel ratio feedback control being performed by the air-fuel ratio feedback control means, and for judging a deviation or deterioration in the characteristic of the air-fuel ratio sensor on the basis of the amplitude and the period.

According to a third aspect of the present invention, there is provided an air-fuel ratio control apparatus for an internal combustion engine, comprising: an exhaust gas purifying catalyst mounted in an exhaust passage of the internal combustion engine; an upstream air-fuel ratio sensor mounted upstream of the exhaust gas purifying catalyst and having an output characteristic substantially proportional to the oxygen concentration in exhaust gas; air-fuel ratio feedback control means for performing feedback control so as to bring an air-fuel ratio to a target air-fuel ratio on the basis of a difference between an output of the upstream air-fuel ratio sensor and a target output corresponding to the target air-fuel ratio; a downstream air-fuel ratio sensor mounted downstream of the exhaust gas purifying catalyst; catalyst deterioration judging means for judging deterioration of the exhaust gas purifying catalyst on the basis of the lengths of response curves that the outputs of the upstream air-fuel ratio sensor and the downstream air-fuel ratio sensor respectively describe for a prescribed period during the air-fuel ratio feedback control being performed by the air-fuel ratio feedback control means; and response curve length correcting means for calculating an amplitude of the output of the upstream air-fuel ratio sensor, measured in reference to the target output, and a period from the time the output of the upstream air-fuel ratio sensor crosses the target output to the time the output returns to the target output, each time an inversion occurs in the output of the upstream air-fuel ratio sensor with respect to the target output during the air-fuel ratio feedback control being performed by the air-fuel ratio feedback control means, and for correcting on the basis of the amplitude and the period the output response curve length of the upstream air-fuel ratio sensor calculated by the catalyst deterioration judging means.

According to a fourth aspect of the present invention, there is provided an air-fuel ratio control apparatus for an internal combustion engine, comprising: an exhaust gas purifying catalyst mounted in an exhaust passage of the internal combustion engine; an air-fuel ratio sensor mounted upstream of the exhaust gas purifying catalyst and having an output characteristic substantially proportional to the oxygen concentration in the exhaust gas; air-fuel ratio feedback control means for performing feedback control so as to bring the air-fuel ratio to a target air-fuel ratio on the basis of a difference between an output of the air-fuel ratio sensor and a target output corresponding to the target air-fuel ratio; and sensor output correcting means for calculating an output response curve length of the air-fuel ratio sensor and an area enclosed by the output of the air-fuel ratio sensor and the target output for a prescribed period during the air-fuel ratio feedback control being performed by the air-fuel ratio feedback control means, and for correcting the output of the air-fuel ratio sensor on the basis of the response curve length and the area.

According to a fifth aspect of the present invention, there is provided an air-fuel ratio control apparatus for an internal combustion engine, comprising: an exhaust gas purifying catalyst mounted in an exhaust passage of the internal combustion engine; an air-fuel ratio sensor mounted upstream of the exhaust gas purifying catalyst and having an output characteristic substantially proportional to the oxygen concentration in the exhaust gas; air-fuel ratio feedback control means for performing feedback control so as to bring the air-fuel ratio to a target air-fuel ratio on the basis of a difference between an output of the air-fuel ratio sensor and a target output corresponding to the target air-fuel ratio; and sensor fault judging means for calculating an output response curve length of the air-fuel ratio sensor and an area enclosed by the output of the air-fuel ratio sensor and the target output for a prescribed period during the air-fuel ratio feedback control being performed by the air-fuel ratio feedback control means, and for judging a deviation or deterioration in the characteristic of the air-fuel ratio sensor on the basis of the response curve length and the area.

According to a sixth aspect of the present invention, there is provided an air-fuel ratio control apparatus for an internal combustion engine, comprising: an exhaust gas purifying catalyst mounted in an exhaust passage of the internal combustion engine; an upstream air-fuel ratio sensor mounted upstream of the exhaust gas purifying catalyst and having an output characteristic substantially proportional to the oxygen concentration in the exhaust gas; first air-fuel ratio feedback control means for performing feedback control so as to bring the air-fuel ratio to a target air-fuel ratio on the basis of a difference between an output of the upstream air-fuel ratio sensor and an upstream air-fuel ratio sensor target output corresponding to the target air-fuel ratio; a downstream air-fuel ratio sensor mounted downstream of the exhaust gas purifying catalyst; second air-fuel ratio feedback control means for correcting the output of the upstream air-fuel ratio sensor on the basis of a difference between an output of the downstream air-fuel ratio sensor and a downstream air-fuel ratio sensor target output; and sensor fault judging means for calculating an upstream response curve length that the output of the upstream air-fuel ratio sensor describes, an upstream area enclosed by the output of the upstream air-fuel ratio sensor and the upstream air-fuel ratio sensor target output, and at least either a downstream response curve length that the output of the downstream air-fuel ratio sensor describes or a downstream area enclosed by the output of the downstream air-fuel ratio sensor and the downstream air-fuel ratio sensor target output, for a prescribed period during the air-fuel ratio feedback control being performed by the first and the second air-fuel ratio feedback control means, and for judging a deviation or deterioration in the characteristic of the upstream air-fuel sensor on the basis of the upstream response curve length, the upstream area, and at least either the downstream response curve length or the downstream area.

According to a seventh aspect of the present invention, there is provided an air-fuel ratio control apparatus for an internal combustion engine, comprising: an exhaust gas purifying catalyst mounted in an exhaust passage of the internal combustion engine; an upstream air-fuel ratio sensor mounted upstream of the exhaust gas purifying catalyst and having an output characteristic substantially proportional to the oxygen concentration in the exhaust gas; air-fuel ratio feedback control means for performing feedback control so as to bring the air-fuel ratio to a target air-fuel ratio on the basis of a difference between an output of the upstream air-fuel ratio sensor and a target output corresponding to the target air-fuel ratio; a downstream air-fuel ratio sensor mounted downstream of the exhaust gas purifying catalyst; and catalyst deterioration judging means for calculating an output response curve length of the upstream air-fuel ratio sensor, an output response curve length of the downstream air-fuel ratio sensor, and an area enclosed by the output of the upstream air-fuel ratio sensor and the target output, for a prescribed period during the air-fuel ratio feedback control being performed by the air-fuel ratio feedback control means, and for correcting the output response curve length of the upstream air-fuel ratio sensor on the basis of the area and the output response curve length of the upstream air-fuel ratio sensor, and judging deterioration of the exhaust gas purifying catalyst on the basis of the corrected output response curve length of the upstream air-fuel ratio sensor and the output response curve length of the downstream air-fuel ratio sensor.

BRIEF DESCRIPTION OF THE DRAWINGS

Further features and advantages of the present invention will be apparent from the following description with reference to the accompanying drawings, in which:

FIG. 8 is a diagram for explaining how the estimated cylinder air amount and calculated target cylinder fuel amount are stored;

FIGS. 9A, 9B, and 9C are diagrams showing the relationship between the A/F sensor output voltage VAF actually measured (indicated by solid lines) and the A/F sensor output voltage (real A/F equivalent voltage) that should be output according to the real A/F (indicated by dashed lines), when the A/F sensor characteristic is normal, when it deviates in an output increasing direction, and when it deviates in an output decreasing direction, respectively;

FIG. 10 is a diagram for explaining the amplitude VP and the period CPER;

FIGS. 17A and 17B show a flowchart illustrating a processing sequence for a catalyst deterioration detection routine;

FIGS. 21A, 21B, and 21C show a flowchart illustrating a processing sequence for an A/F sensor characteristic learning and catalyst deterioration detection routine according to a second embodiment;

FIGS. 26A, 26B, and 26C show a flowchart illustrating a processing sequence for an A/F sensor characteristic learning and catalyst deterioration detection routine according to a third embodiment.

DESCRIPTION OF THE PREFERRED EMBODIMENTS

The preferred embodiments of the present invention will be described below with reference to the accompanying drawings.

Figure 5:
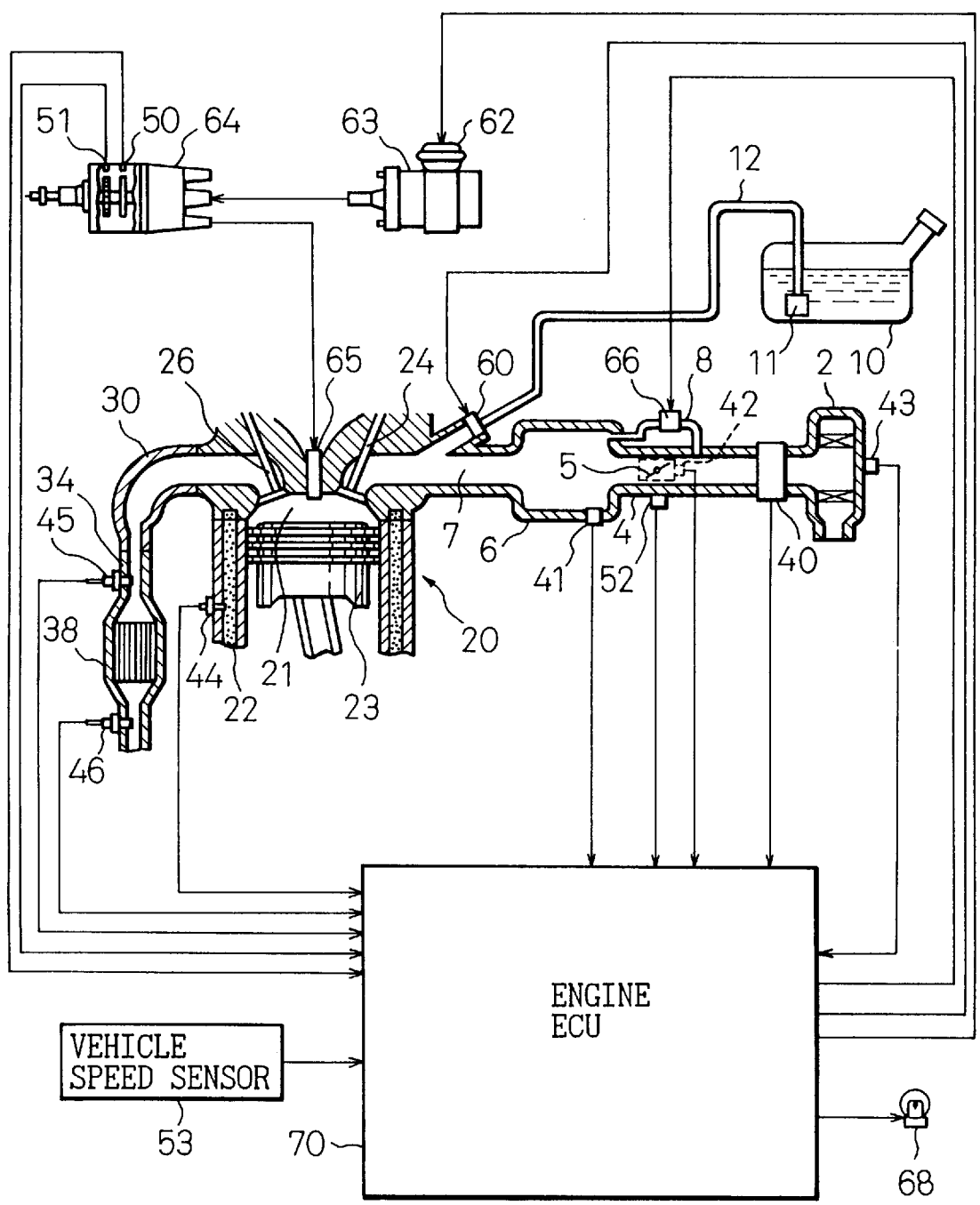
FIG. 5 is a schematic diagram showing the general construction of an electronically controlled internal combustion engine equipped with an air-fuel ratio control apparatus according to one embodiment of the present invention.

FIG. 5 is a schematic diagram showing the general construction of an electronically controlled internal combustion engine equipped with an air-fuel ratio control apparatus according to one embodiment of the present invention. Air necessary for combustion in the engine is filtered through an air cleaner 2, and introduced through a throttle body 4 into a surge tank (intake manifold) 6 for distribution to an intake pipe 7 of each cylinder. The flow rate of the intake air is measured by an air flow meter 40, and is regulated by a throttle valve 5 provided in the throttle body 4. Intake air temperature is detected by an intake air temperature sensor 43. Further, intake manifold pressure is detected by a vacuum sensor 41.

The opening angle of the throttle valve 5 is detected by a throttle angle sensor 42. When the throttle valve 5 is in its fully closed position, an idle switch 52 is turned on, and its output as a throttle full-close signal is set active. An idle speed control valve (ISCV) 66 for adjusting air flow rate during idling is installed in an idle adjust passage 8 that bypasses the throttle valve 5.

On the other hand, the fuel stored in a fuel tank 10 is drawn by a fuel pump 11, passed through a fuel pipe 12, and injected into the intake pipe 7 through a fuel injector valve 60.

The air and fuel are mixed together in the intake pipe 7, and the mixture is drawn through an intake valve 24 into a combustion chamber 21 of a cylinder 20, that is, into the engine body. In the combustion chamber 21, the air-fuel mixture is first compressed by a piston 23, and then ignited and burned causing a rapid pressure rise and thus producing power. To accomplish the ignition, an ignition signal is applied to an igniter 62, which controls the supply and cutoff of a primary current to an ignition coil 63, and the resulting secondary current is supplied to a spark plug 65 by an ignition distributor 64.

The ignition distributor 64 is provided with a reference position detection sensor 50 which generates a reference position detection pulse for every 720° CA rotation of its shaft measured in degrees of crankshaft angle (CA), and a crankshaft angle sensor 51 which generates a position detection pulse for every 30° CA. Actual vehicle speed is detected by a vehicle speed sensor 53 that produces output pulses representing the vehicle speed. The engine body (cylinder) 20 is cooled by a coolant introduced into a coolant passage 22, and the coolant temperature is detected by a coolant temperature sensor 44.

The burned air-fuel mixture is discharged as exhaust gas into an exhaust manifold 30 through an exhaust valve 26, and then introduced into an exhaust pipe 34. In the exhaust pipe 34 is mounted an A/F sensor 45 which linearly detects air-fuel ratio based on the concentration of oxygen in the exhaust gas. In the exhaust system further downstream there is mounted a catalytic converter 38 which contains a three-way catalyst for simultaneously promoting the oxidation of unburned constituents (HC and CO) and the reduction of nitrogen oxides ($NO_x$) contained in the exhaust gas. The exhaust gas thus purified in the catalytic converter 38 is discharged into the atmosphere.

This engine is of the type that performs sub air-fuel ratio feedback control in order to vary the target control center in the air-fuel ratio control performed using the A/F sensor 45, and an $O_2$ sensor 46 is mounted in the exhaust system downstream of the catalytic converter 38.

Figure 6:
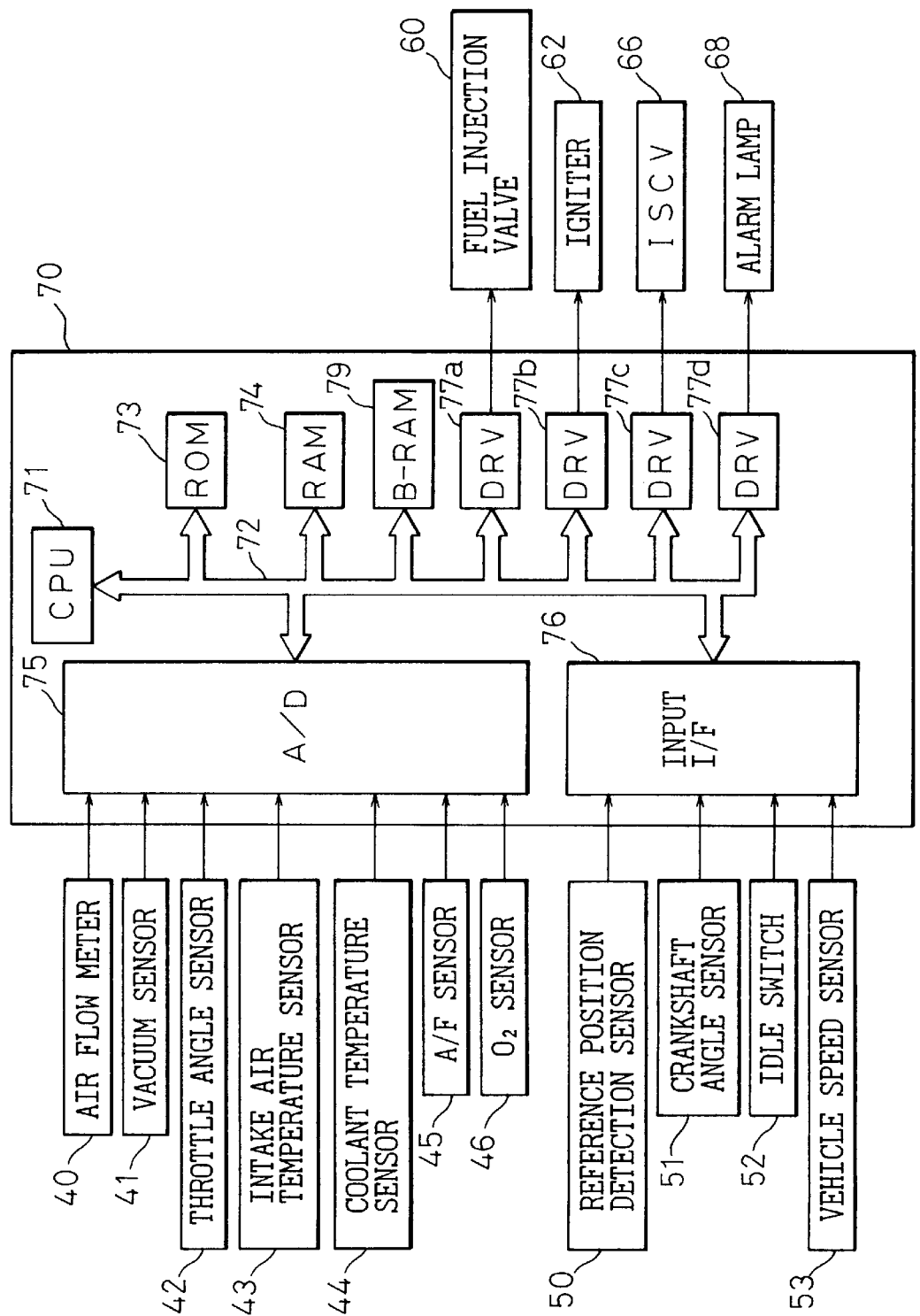
FIG. 6 is a block diagram showing the hardware configuration of an engine ECU according to one embodiment of the present invention.

An engine electronic control unit (engine ECU) 70 is also shown which is a microcomputer system that performs processing for the detection of catalyst deterioration, as well as fuel injection control (air-fuel ratio control), ignition timing control, idle speed control, etc. The hardware configuration is shown in the block diagram of FIG. 6. Signals from the various sensors and switches are input via an A/D conversion circuit 75 or via an input interface circuit 76 to a central processing unit (CPU) 71 which, in accordance with programs and various maps stored in a read-only memory (ROM) 73, performs arithmetic operations using the input signals and, based on the results of the operations, outputs control signals for the various actuators via respective drive control circuits 77a–77d. A random-access memory (RAM) 74 is used to temporarily store data during the arithmetic operation and control processes. A backup RAM 79 is supplied with power from a battery (not shown) directly connected to it, and is used to store data (such as various learning values) that should be retained when the ignition switch is off. These constituent parts of the ECU are interconnected by a system bus 72 consisting of an address bus, a data bus, and a control bus.

A description will now be given of the engine control process performed by the ECU 70 for the internal combustion engine having the above-described hardware configuration.

Ignition timing control is performed by sending an ignition signal to the igniter 62 via the drive control circuit 77b after determining optimum ignition timing by comprehensively judging the engine condition based on engine rpm obtained from the crankshaft angle sensor 51 and on signals from other sensors.

In idle speed control, an idle state is detected based on the throttle full-close signal from the idle switch 52 and the vehicle speed signal from the vehicle speed sensor 53, and actual engine rpm is compared with the target rpm determined by the engine coolant temperature from the coolant temperature sensor 44, etc. Based on the resulting error, the control amount to achieve the target rpm is determined, and the amount of air is adjusted by controlling the ISCV 66 via the drive control circuit 77c, thereby maintaining optimum idle speed.

The air-fuel ratio control (fuel injection control) and A/F sensor fault and catalyst deterioration detection procedures according to the present invention will be described in detail below in conjunction with associated routines illustrating the processing sequences thereof.

Figure 7:
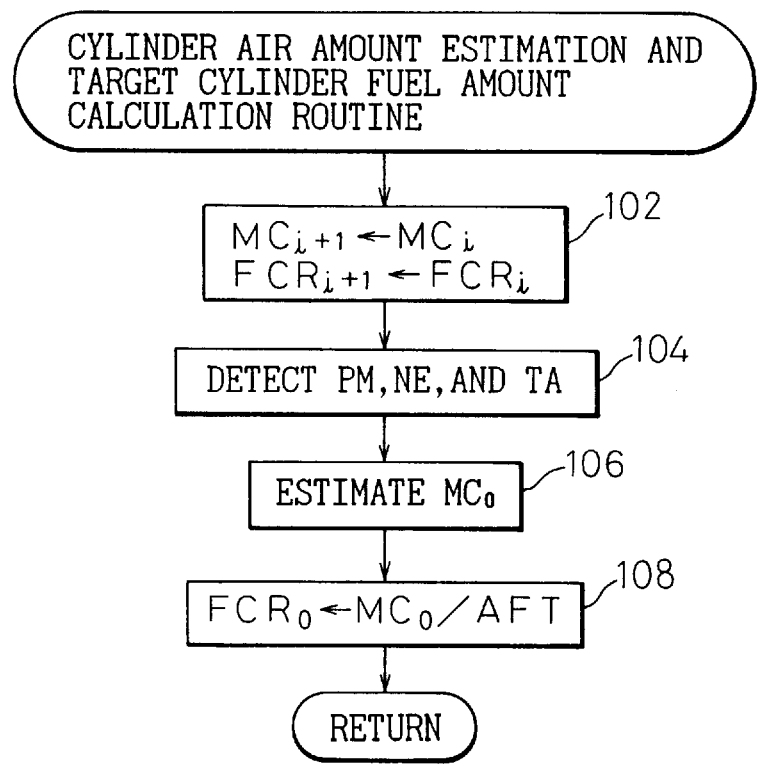
FIG. 7 is a flowchart illustrating a processing sequence for a cylinder air amount estimation and target cylinder fuel amount calculation routine.

FIG. 7 is a flowchart illustrating a processing sequence for a cylinder air amount estimation and target cylinder fuel amount calculation routine. This routine is executed for every predetermined crankshaft angle. First, cylinder air amount $MC_i$ and target cylinder fuel amount $FCR_i$, obtained from engine operation up to the previous execution of the routine, are updated. More specifically, $MC_i$ and $FCR_i$ "i" times back (i=0, 1, . . . , n−1) are updated to $MC_{i+1}$ and $FCR_{i+1}$ "i+1" times back (step 102). This is done to store data of the cylinder air amount $MC_i$ and target cylinder fuel amount $FCR_i$ for the past n times into the RAM 74 and to calculate new $MC_0$ and $FCR_0$.

Then, based on the outputs from the vacuum sensor 41, crankshaft angle sensor 51, and throttle angle sensor 42, the present intake manifold pressure PM, engine rpm NE, and throttle angle TA are obtained (step 104). Then, using the data of PM, NE, and TA, the air amount $MC_0$ supplied into the cylinder is estimated (step 106). Usually, the cylinder air amount can be estimated from the intake manifold pressure PM and engine rpm NE, but in this embodiment, provisions are made to detect a transient state based on a change in the value of the throttle angle TA so that an accurate air amount can be calculated in a transient state.

Next, using the cylinder air amount $MC_0$ and stoichiometric air-fuel ratio AFT, the calculation $$FCR_0 \leftarrow MC_0/AFT$$

is performed to calculate the target fuel amount $FCR_0$ that should be supplied into the cylinder to maintain the air-fuel mixture at stoichiometry (step 108). The thus calculated cylinder air amount $MC_0$ and target cylinder fuel amount $FCR_0$ are stored in the RAM 74, as shown in FIG. 8, as the latest data obtained from the present execution of the routine.

In the present invention, the air-fuel ratio control and catalyst deterioration detection processes are performed while accounting for a deviation in the characteristic of the A/F sensor. The principle of operation will be described below. FIGS. 9A, 9B, and 9C are diagrams showing the relationship between the A/F sensor output voltage VAF actually measured (indicated by solid lines) and the A/F sensor output voltage (real A/F equivalent voltage) that should be output according to the real A/F (indicated by dashed lines), when the A/F sensor characteristic is normal, when it deviates in an output increasing direction, and when it deviates in an output decreasing direction, respectively. These diagrams show comparisons made when the difference (amplitude) between the A/F sensor output voltage VAF and the target voltage (stoichiometry equivalent voltage) VAFT is the same for FIGS. 9A, 9B, and 9C.

In air-fuel ratio feedback control, control is performed in such a manner as to increase the fuel correction amount as the difference between the output voltage VAF and the target voltage VAFT increases. Accordingly, if the characteristic of the A/F sensor deviates in the output increasing direction, the amount of fuel correction will become excessively large and, as shown in FIG. 9B, the period from the time the output voltage VAF crosses the target voltage VAFT to the time it returns to the target voltage will become short compared with a normally functioning A/F sensor (FIG. 9A). On the other hand, if the characteristic of the A/F sensor deviates in the output decreasing direction, the amount of fuel correction will become excessively small and, as shown in FIG. 9C, that period will become long compared with the normally functioning A/F sensor (FIG. 9A).

Figure 11:
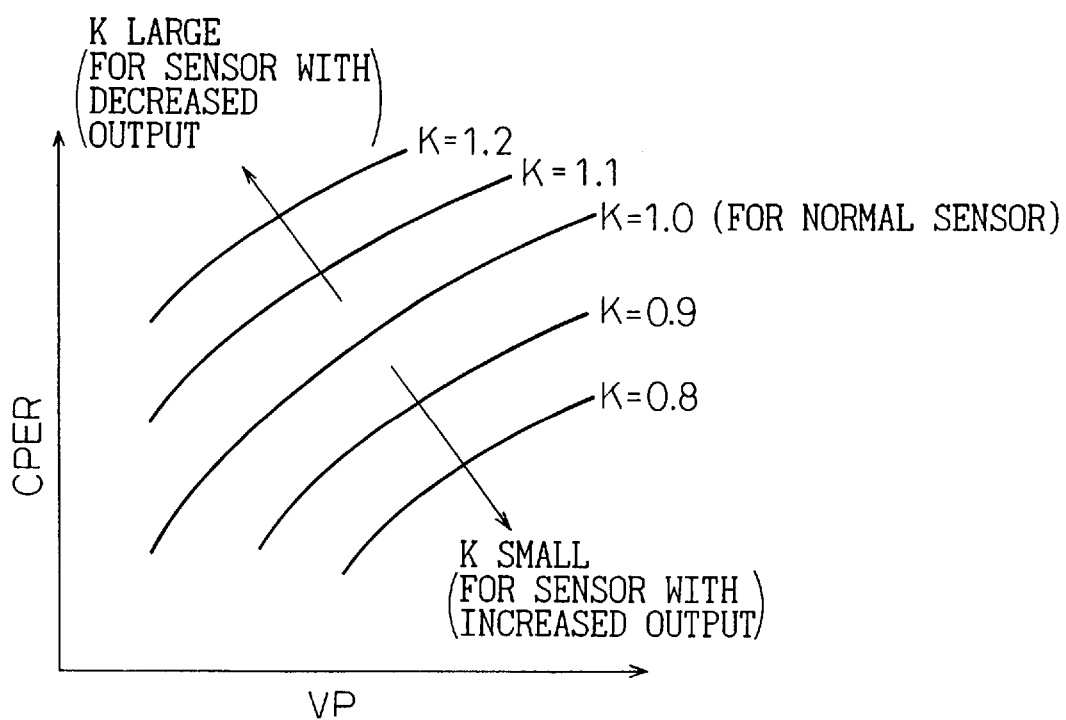
FIG. 11 is a diagram illustrating a map used to obtain an A/F sensor output characteristic correction factor K on the basis of the amplitude VP and the period CPER.

That is, as shown in FIG. 10, the A/F sensor output voltage VAF is monitored, and its amplitude VP and period CPER are calculated; from the relationship between them, the correction factor K for correcting VAF according to the deviation of the sensor characteristic can be obtained. FIG. 11 is a diagram illustrating a map used to obtain A/F sensor output voltage correction factor K based on the amplitude VP and period CPER. As shown in the figure, for a given amplitude VP, since the deviation of the characteristic in the output decreasing direction becomes greater as the CPER becomes larger relative to the normal value, the correction factor K is set to a value greater than 1.0. On the other hand, for a given amplitude VP, since the deviation of the characteristic in the output increasing direction becomes greater as the CPER becomes smaller relative to the normal value, the correction factor K is set to a value smaller than 1.0.

Figure 12A:
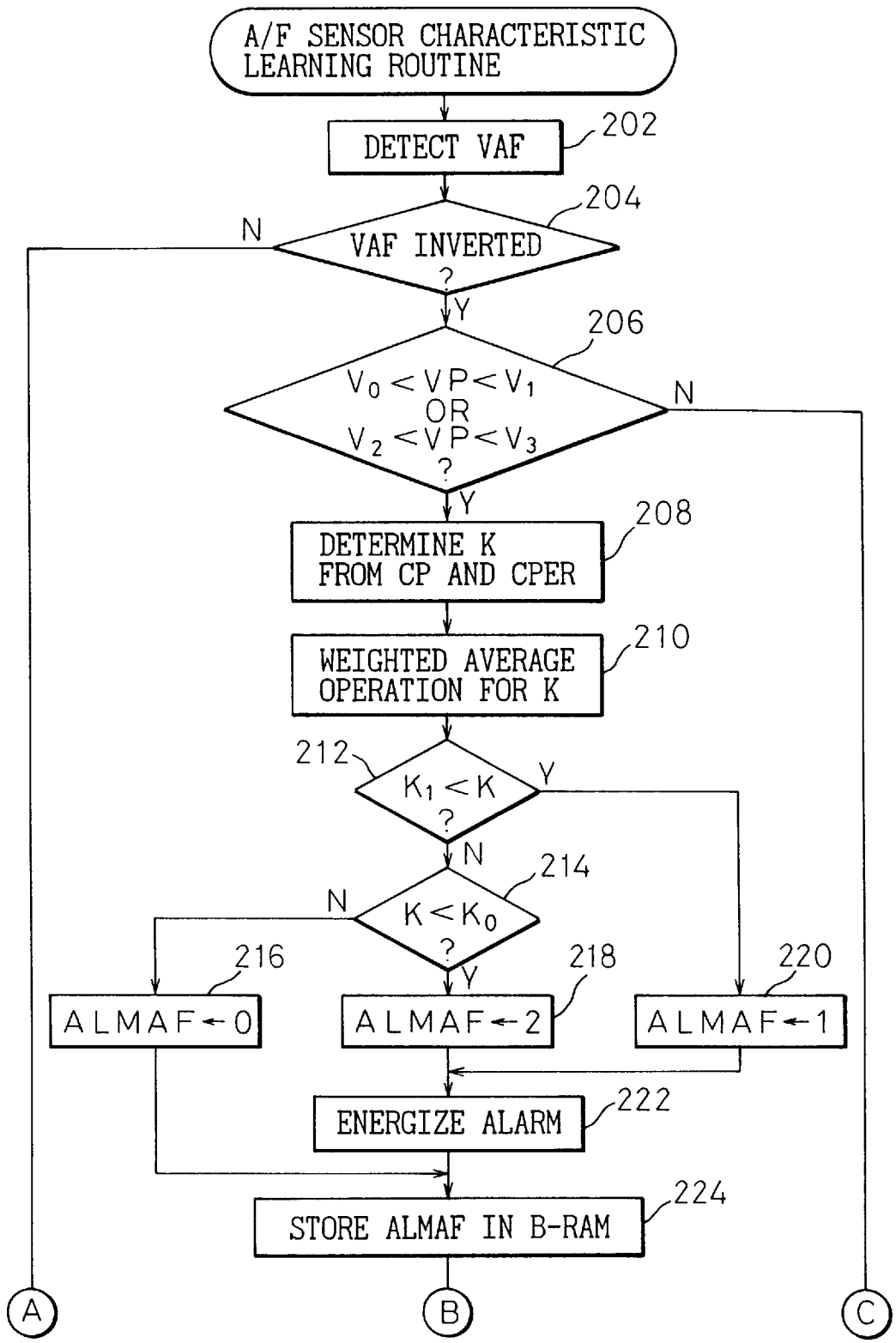
FIGS. 12A and 12B show a flowchart illustrating a processing sequence for an A/F sensor characteristic learning routine.
Figure 12B:
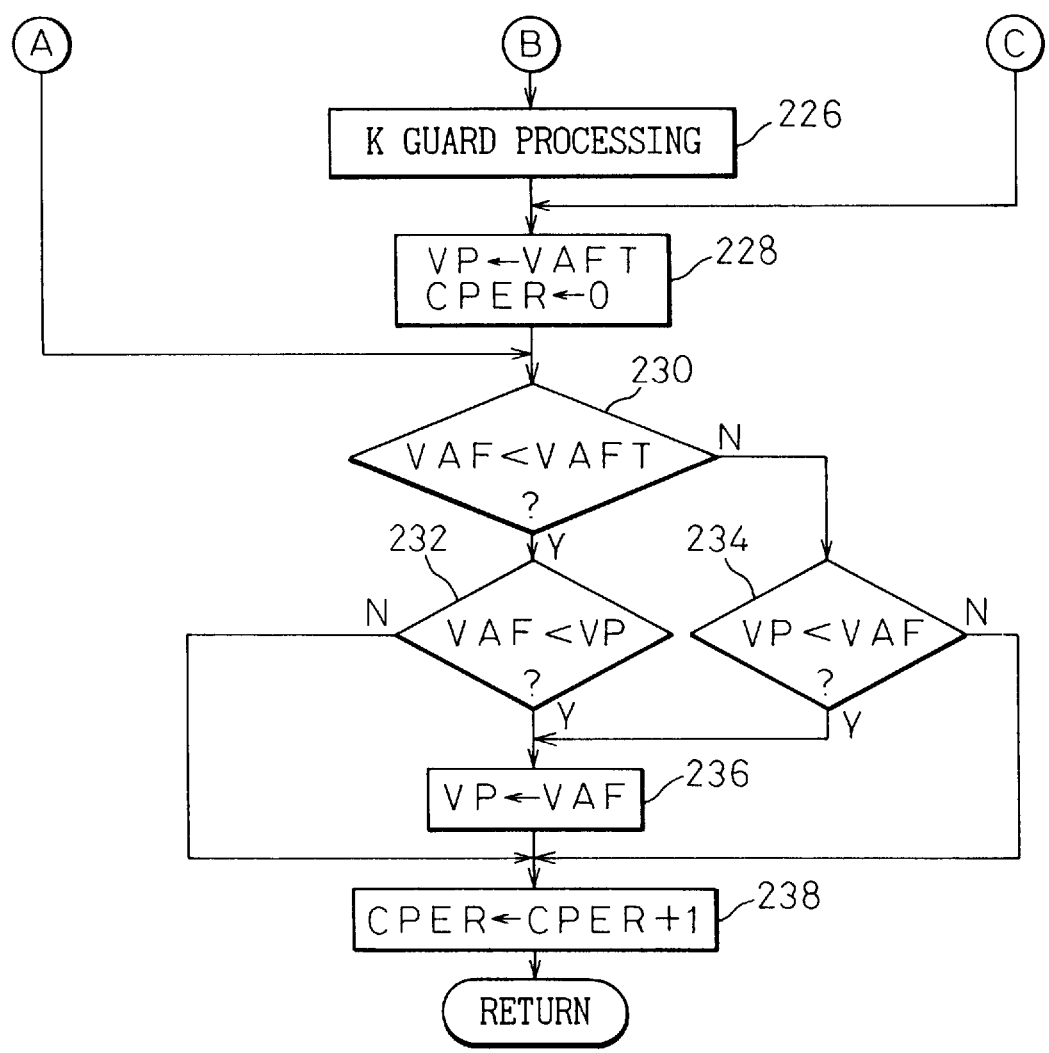

An A/F sensor characteristic learning routine, implementing the processing for obtaining the correction factor K and detecting the deviation and deterioration of the A/F sensor, is shown in flowchart form in FIGS. 12A and 12B. This routine is executed at prescribed intervals of time. First, the output voltage VAF of the A/F sensor 45 is detected (step 202). Next, it is determined whether or not the detected VAF is inverted relative to the previously detected value about the target voltage (stoichiometry equivalent voltage) VAFT (for example, 3.3 V) (step 204).

If the VAF is not inverted, VAF is compared with VAFT (step 230). If VAF<VAFT, then it is determined whether or not VAF is smaller than the rich-side peak value (rich-side amplitude) VP that has been obtained from engine operation up to the previous execution of the routine (step 232), and if VAF<VP, VP is updated using the VAF value (step 236). Similarly, if VAF≧VAFT, it is determined whether or not VAF is larger than the lean-side peak value (lean-side amplitude) VP that has been obtained from engine operation up to the previous execution of the routine (step 234), and if VP<VAF, VP is updated using the VAF value (step 236). In step 238 which is performed after step 232, 234, or 236, counter CPER for measuring the period from the time the output voltage VAF crosses the target voltage VAFT to the time it returns to VAFT is incremented.

Figure 13:
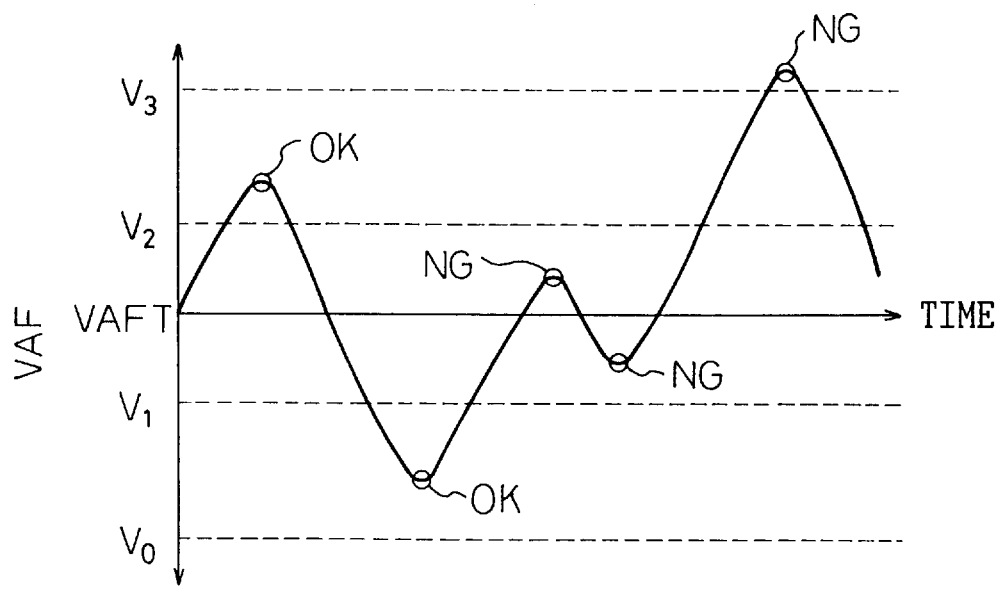
FIG. 13 is a diagram for explaining learning conditions based on the amplitude VP.

On the other hand, if it is determined in step 204 that the VAF is inverted, then it is determined whether or not the amplitude VP that has been obtained from engine operation up to the previous execution of the routine is within a prescribed range, that is, whether or not the relation $V_0<VP<V_1$ or $V_2<VP<V_3$ (see FIG. 13) is satisfied (step 206). The A/F sensor characteristic learning process is performed only when the VP is within the prescribed range, because the accuracy of learning can then be enhanced. If the result of the decision in step 206 is NO, the process proceeds to step 228 to be described later.

If the result of the decision in step 206 is YES, the correction factor K is obtained by referring to the map of FIG. 11 based on the amplitude VP and period CPER (step 208). This map is prestored in the ROM 73. Next, a weighted average operation is performed on the correction factor K (step 210). That is, the weighted average value KSM calculated up to the previous time is updated by the equation $$KSM \leftarrow KSM+(K-KSM)/m=[(m-1)KSM+K]/m$$

and the result is taken as the weighted average correction factor K. Here, m is the weighted average rate. In the weighted average operation, the weighted average value up to the previous time is weighted by (m−1) and the present calculated value by 1, and the average of them is taken as the new weighted average value.

Next, in step 212, it is determined whether or not the correction factor K is larger than a fault determination upper-limit reference value $K_1$. If $K_1<K$, it is determined that a fault condition has occurred (output deteriorated), and a designated alarm flag ALMAF is set to 1 (step 220), while at the same time, an alarm lamp 68 (see FIG. 5) is turned on (step 222). In step 214, it is determined whether or not the correction factor K is smaller than a fault determination lower-limit reference value $K_0$. If $K<K_0$, it is determined that a fault condition has occurred (an out-of-range condition), and the designated alarm flag ALMAF is set to 2 (step 218), while at the same time, the alarm lamp 68 is turned on (step 222).

On the other hand, if $K_0 \leq K \leq K_1$, it is determined that the condition is normal, and the alarm flag ALMAF is set to 0 (step 216). The alarm flag ALMAF is stored in the backup RAM 79 (step 224) so that it can be recovered at the time of repair or inspection. Next, in step 226, guard processing is performed to limit the correction factor K to within a predetermined range so that it will not take an extreme value. In step 228, VP and CPER are initialized to prepare for the next amplitude/period calculation process. Thereafter, the process proceeds to the earlier described step 230. The A/F sensor output characteristic correction factor K obtained in the above process is used in the main air-fuel ratio feed back control and catalyst deterioration detection processes hereinafter described.

Figure 14:
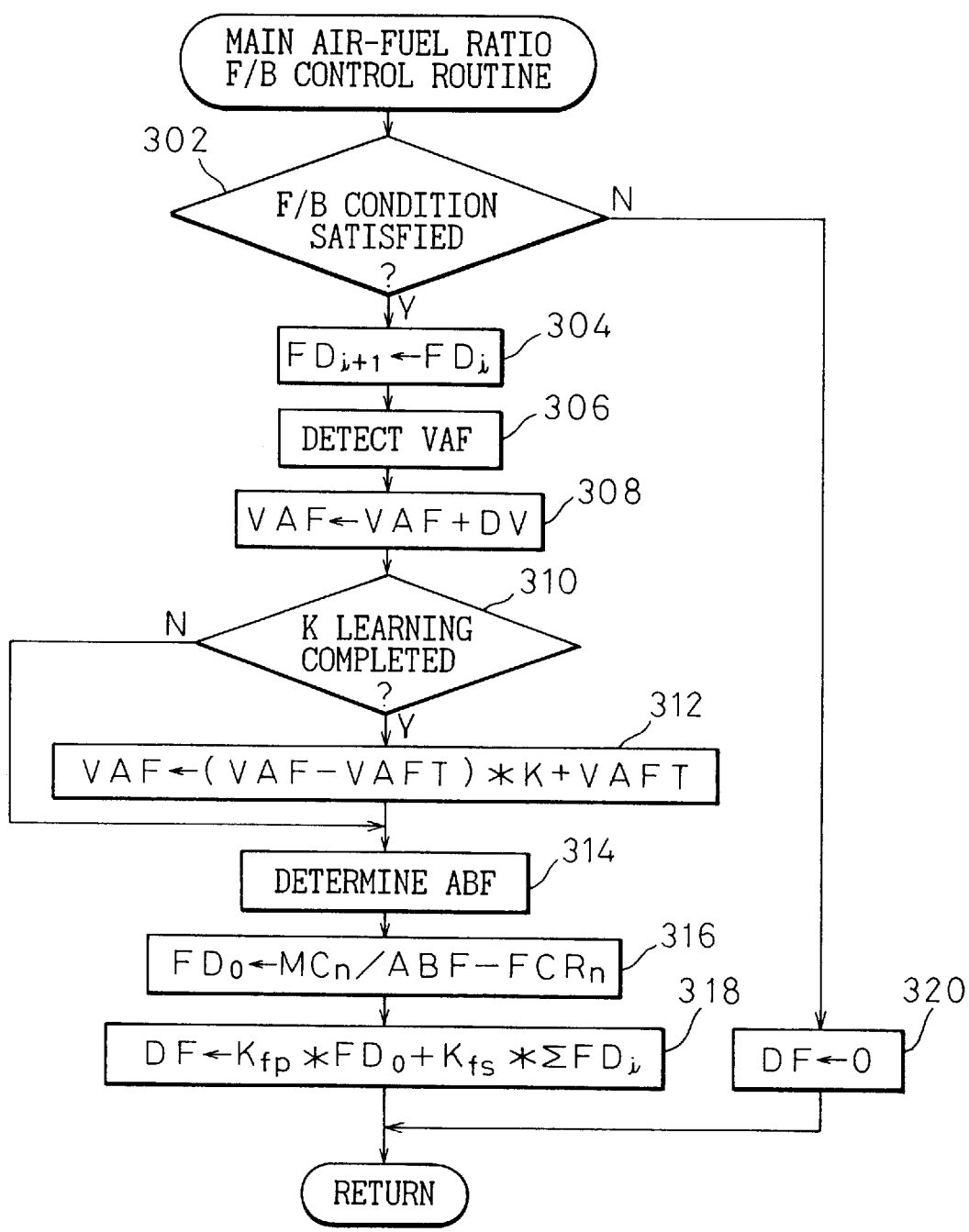
FIG. 14 is a flowchart illustrating a processing sequence for a main air-fuel ratio feedback control routine.

FIG. 14 is a flowchart illustrating a processing sequence for the main air-fuel ratio feedback control routine. This routine is executed for every predetermined crankshaft angle. First, it is determined whether a condition for feedback to be initiated is satisfied (step 302). The feedback condition is not satisfied, for example, when the coolant temperature is below a predetermined value, the engine is being cranked, the quantity of fuel is being increased after engine start or during engine warmup, there is no change in the output signal of the A/F sensor 45, or the fuel is being cut off. In other cases, the feedback condition is satisfied. If the condition is not satisfied, the fuel correction amount DF in the feedback control is set to 0 (step 320), and the routine is terminated.

When the feedback condition is satisfied, the fuel amount error $FD_i$ (the difference between the actually burned fuel amount and the target cylinder fuel amount) that has been obtained from engine operation up to the previous execution of the routine is updated. More specifically, $FD_i$ "i" times back (i=0, 1, ..., m-1) is updated to $FD_{i+1}$ "i+1" times back (step 304). This is done to store data of the fuel amount error $FD_i$ for the past m times into the RAM 74 and to calculate new fuel amount error $FD_0$.

Next, the output voltage value VAF of the A/F sensor 45 is detected (step 306). Then, using the A/F sensor output voltage correction amount DV calculated by the sub air-fuel ratio feedback control described later, the calculation $$VAF \leftarrow VAF+DV$$

is performed to correct the A/F sensor output voltage VAF (step 308). With such correction, the center of the air-fuel ratio fluctuation is gradually shifted until the target voltage is reached in the sub air-fuel ratio feedback control.

Next, it is determined whether or not the learning of the correction factor K has already been completed by the previously described A/F sensor characteristic learning routine (step 310). If the learning of K has already been completed, VAF after output characteristic correction is obtained by the following calculation (step 312).

$$VAF \leftarrow (VAF-VAFT)*K+VAFT$$

Figure 1:
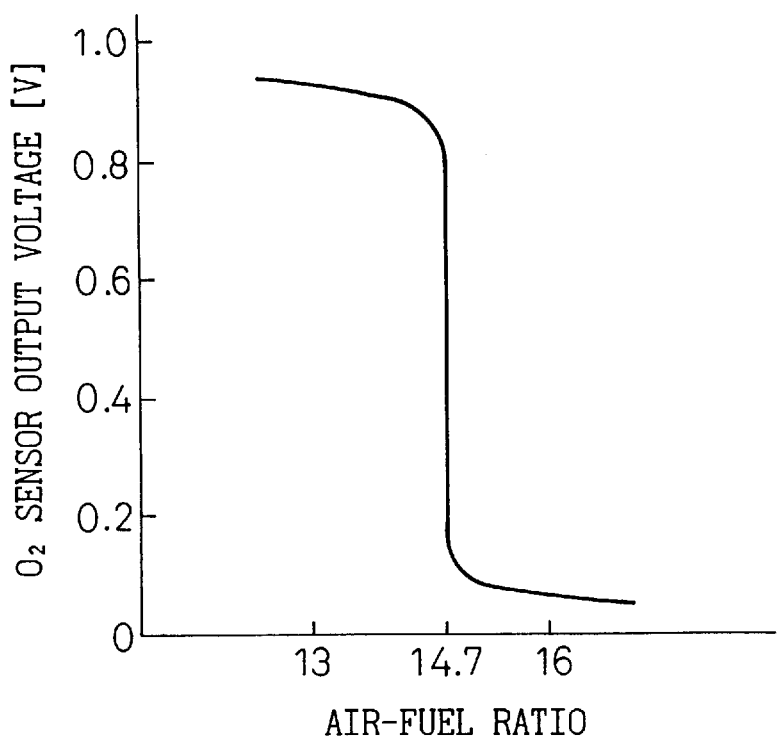
FIG. 1 is a characteristic diagram showing $O_2$ sensor output voltage as a function of air-fuel ratio.
Figure 2:
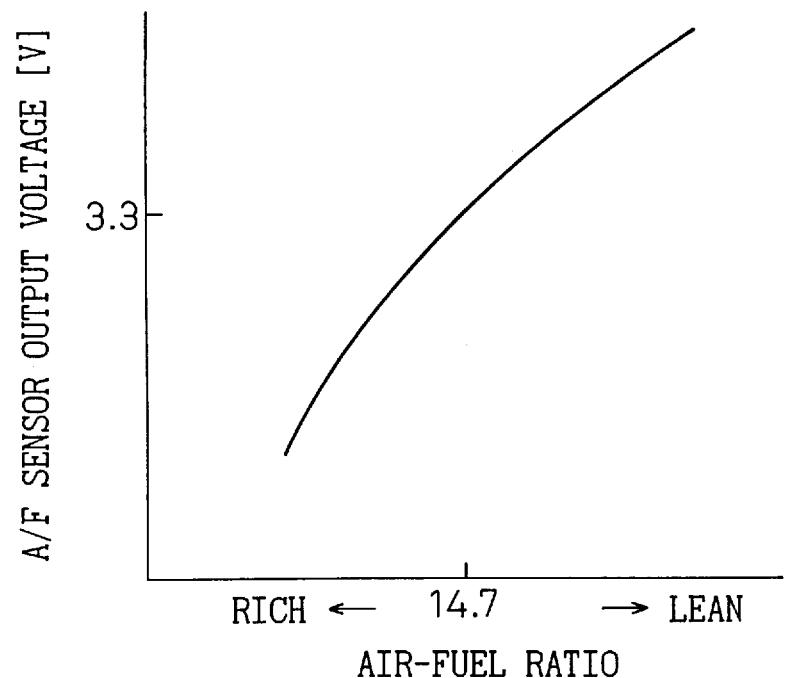
FIG. 2 is a characteristic diagram showing A/F sensor output voltage as a function of air-fuel ratio.
Figure 3A:
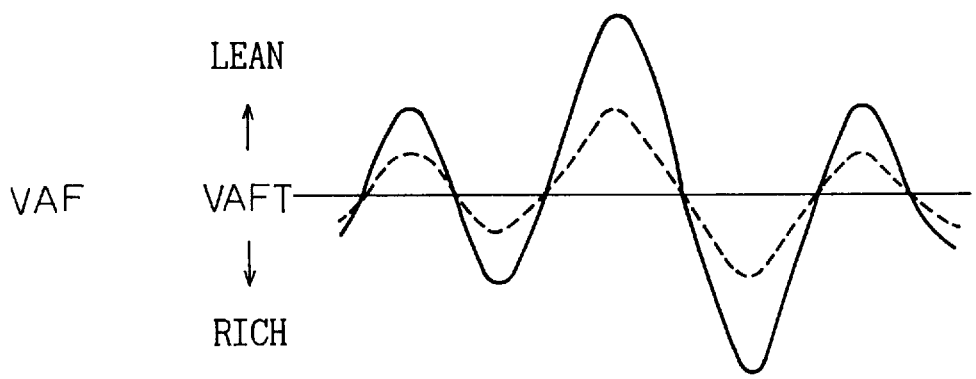
FIGS. 3A and 3B are diagrams for explaining deviations in A/F sensor characteristics.
Figure 3B:
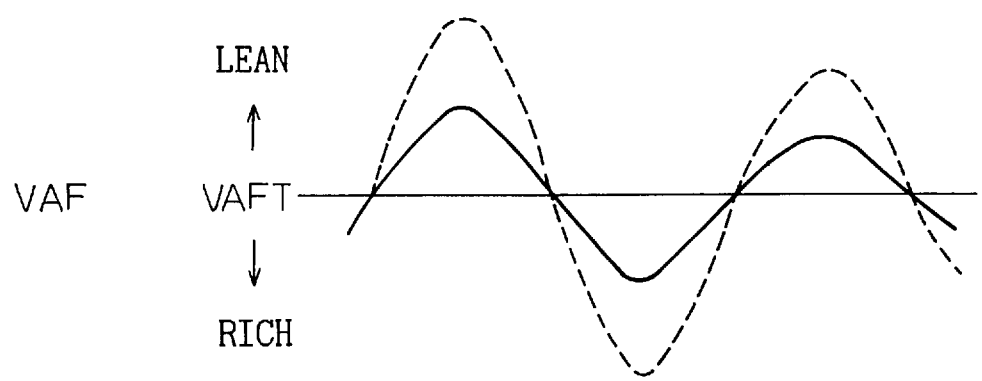

Next, by referring to the characteristic diagram of FIG. 2 based on the corrected VAF, the present air-fuel ratio ABF is determined (step 314). The characteristic diagram of FIG. 2 is converted into a map and stored in advance in the ROM 73.

Next, using the cylinder air amount $MC_n$ and target cylinder fuel amount $FCR_n$ (see FIG. 8) already calculated by the cylinder air amount estimation and target cylinder fuel amount calculation routine, the calculation $$FD_0 \leftarrow MC_n/ABF-FCR_n$$

is performed to obtain the difference between the actually burned fuel amount and the target cylinder fuel amount (step 316). The cylinder air amount $MC_n$ and target cylinder fuel amount $FCR_n$ times back are used considering the time difference between the air-fuel ratio currently being detected by the A/F sensor and the actual combustion. In other words, such time difference necessitates storing the cylinder air amount $MC_i$ and target cylinder fuel amount $FCR_i$ for the past n times.

Next, the calculation $$DF \leftarrow K_{fp}*FD_0+K_{fs}*\Sigma FD_i$$

is performed to determine the fuel correction amount DF applied by proportional-integral control (PI control) (step 318). Here, the first term on the right-hand side is the proportional term of the PI control, and $K_{fp}$ is the proportional gain. Likewise, the second term on the right-hand side is the integral term of PI control, and $K_{fs}$ is the integral gain.

Figure 15:
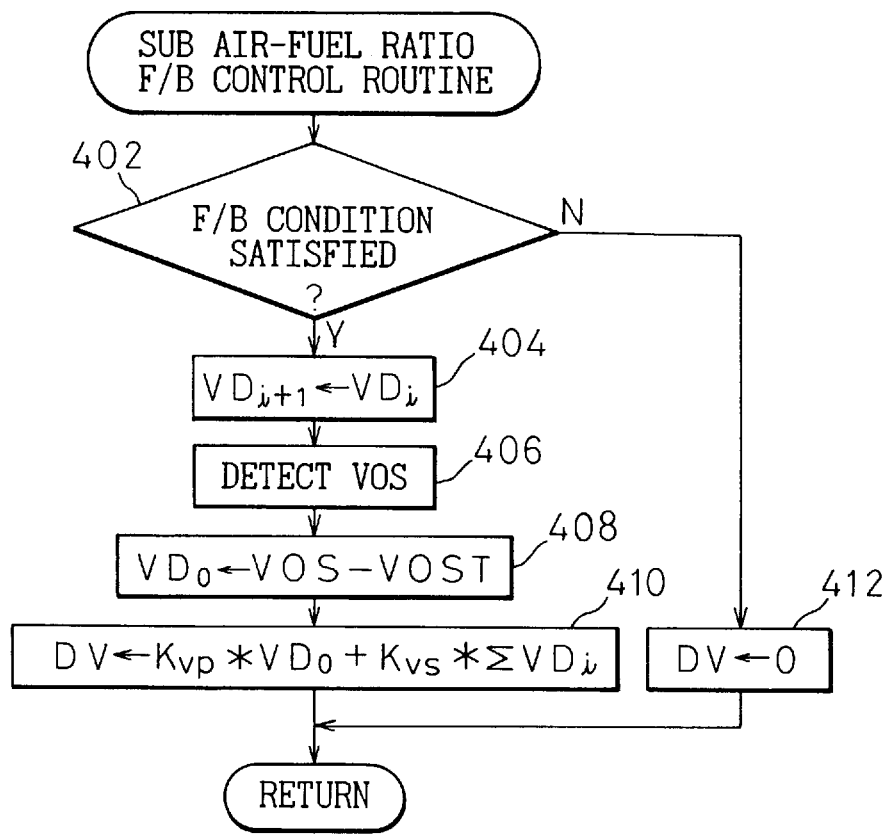
FIG. 15 is a flowchart illustrating a processing sequence for a sub air-fuel ratio feedback control routine.

FIG. 15 is a flowchart illustrating a processing sequence for the sub air-fuel ratio feedback control routine. This routine is executed at prescribed intervals of time longer than the intervals at which the main air-fuel ratio feedback control routine is executed. First, similarly to the main air-fuel ratio feedback control, it is determined whether a condition for sub air-fuel ratio feedback control to be initiated is satisfied (step 402). If the condition is not satisfied, the A/F sensor output voltage correction amount DV is set to 0 (step 412), and the routine is terminated.

When the feedback condition is satisfied, the voltage error $VD_i$ (the difference between the actually detected $O^2$ sensor output voltage and the target $O_2$ sensor output voltage) that has been obtained from engine operation up to the previous execution of the routine is updated. More specifically, $VD_i$ "i" times back (i=0, 1, ..., p-1) is updated to $VD_{i+1}$ "i+1" times back (step 404). This is done to store data of the voltage error $VD_i$ for the past p times into the RAM 74 and to calculate new voltage error $VD_0$.

Next, the output voltage VOS of the $O_2$ sensor 46 is detected (step 406). Then, using the VOS and the target $O_2$ sensor output voltage VOST (for example, 0.5 V), the calculation $$VD_0 \leftarrow VOS-VOST$$

is performed to obtain the latest voltage error $VD_0$ (step 408).

Finally, the calculation $$DV \leftarrow K_{vp}*VD_{0}+K_{vs}*\Sigma VD_i$$

is performed to determine the A/F sensor output voltage correction amount DV applied by PI control (step 410). Here, $K_{vp}$ and $K_{vs}$ are the proportional and integral gains, respectively. The thus determined correction amount DV is used to vary the control center voltage of the feedback control performed using the A/F sensor in the main air-fuel ratio feedback control routine, as previously described.

Figure 16:
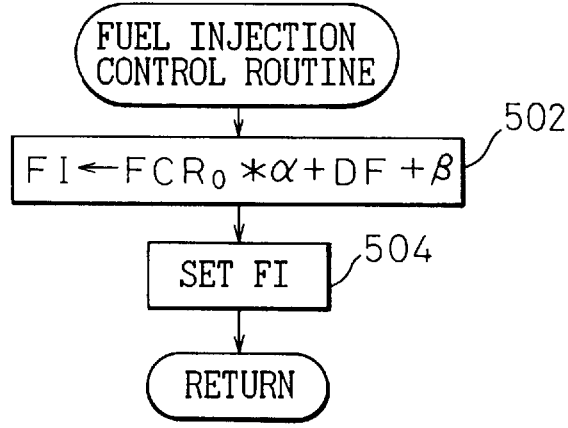
FIG. 16 is a flowchart illustrating a processing sequence for a fuel injection control routine.

FIG. 16 is a flowchart illustrating a processing sequence for a fuel injection control routine. This routine is executed for every predetermined crankshaft angle. First, using the target cylinder fuel amount $FCR_0$ calculated in the earlier described cylinder air amount estimation and target cylinder fuel amount calculation routine, and the feedback correction amount DF calculated in the main air-fuel ratio feedback control routine, the calculation $$FI \leftarrow FCR_0*\alpha+DF+\beta$$

is performed to determine the fuel injection amount FI (step 502). Here, $\alpha$ and $\beta$ are a multiplication correction coefficient and an addition correction amount, respectively, which are determined by other engine operation parameters. For example, $\alpha$ includes basic corrections based on signals from various sensors such as the intake air temperature sensor 43, coolant temperature sensor 44, etc., while $\beta$ includes corrections based on changes in the amount of fuel adhering to wall surfaces (this amount changes with changing intake manifold pressure in a transient driving state). Finally, the determined fuel injection amount FI is set in the drive control circuit 77a for the fuel injection valve 60 (step 504).

Figure 17B:
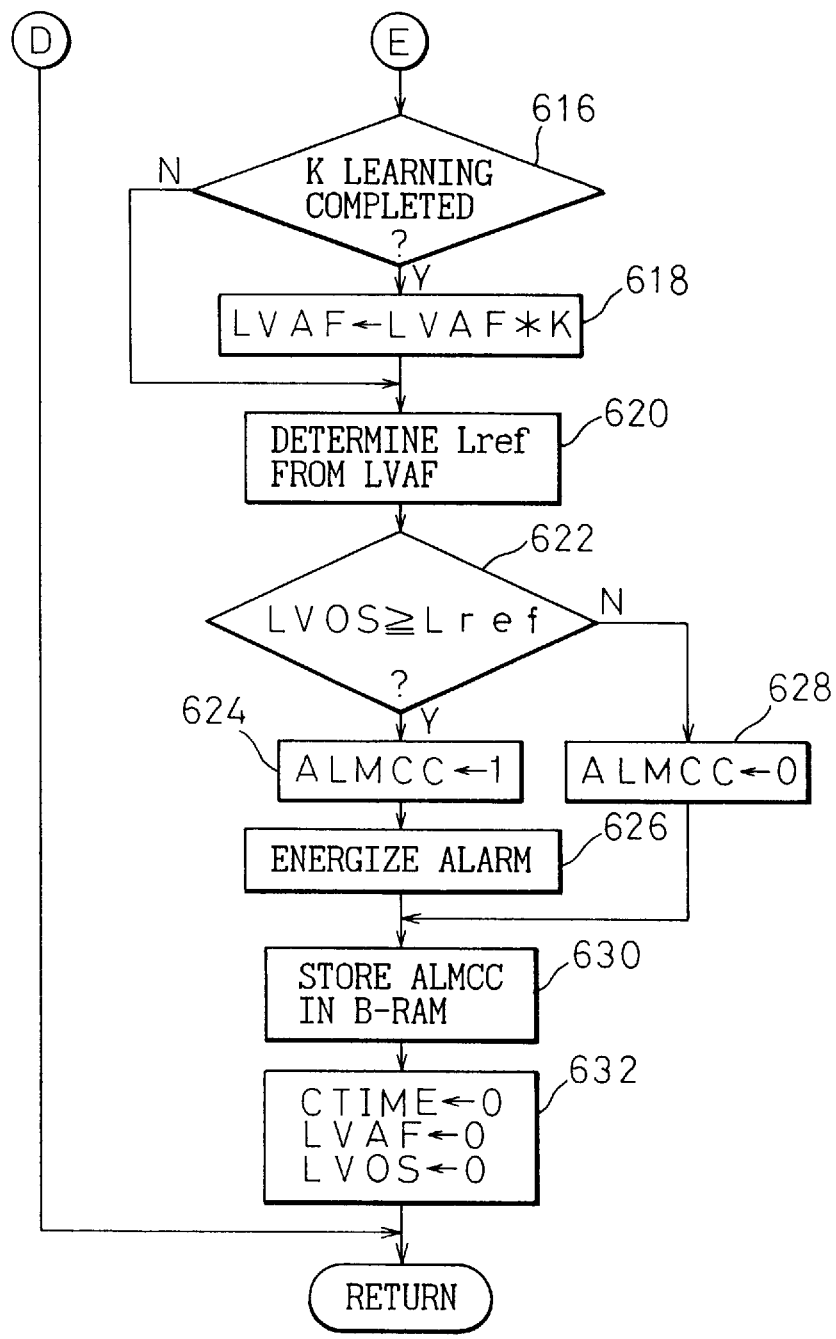

FIGS. 17A and 17B show a flowchart illustrating a processing sequence for a catalyst deterioration detection routine. This routine is executed at prescribed intervals of time. First, in step 602, it is determined whether or not a monitor condition for the judgement of deterioration is satisfied. If the monitor condition is not satisfied, the routine is terminated; if the monitor condition is satisfied, the process proceeds to step 604 and on to subsequent steps. The monitor condition is satisfied, for example, when the main air-fuel ratio feedback control based on the output of the A/F sensor 45 is in progress, the sub air-fuel ratio feedback control based on the output of the $O_2$ sensor 46 is in progress, and the engine load is greater than a predetermined value.

In step 604, the output voltage VAF of the A/F sensor 45 and the output voltage VOS of the $O_2$ sensor 46 are detected. Next, in step 606, the response curve length LVAF of VAF is updated as $$LVAF \leftarrow LVAF + |VAF-VAFO|$$

Next, in step 608, the response curve length LVOS of VOS is adapted as $$LVOS \leftarrow LVOS + |VOS-VOSO|$$

In the next step 610, $$VAFO \leftarrow VAF$$

$$VOSO \leftarrow VOS$$

to prepare for the next execution of the routine. In calculating the response curve length LVAF of the A/F sensor, provisions may be made to stop the summation of the response curve lengths LVAF and LVOS (while holding the result of the summation) when the difference between the maximum and minimum values of the A/F sensor output (the amplitude of the output) momentarily exceeds a threshold value, and to resume the summation when it drops below the threshold value.

Figure 4:
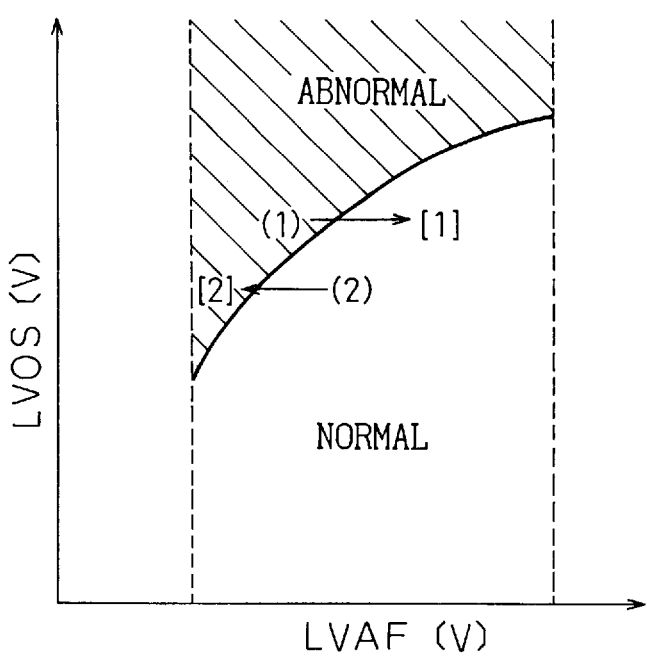
FIG. 4 is a diagram for explaining erroneous detection in a catalyst deterioration detection process.

Next, in step 612, the counter CTIME for measuring monitor time is incremented, and in step 614, it is determined whether or not the counter value has exceeded a predetermined value $C_0$. If CTIME>$C_0$, the process proceeds to step 616, but if CTIME≦$C_0$, the routine is terminated. In step 616, it is determined whether or not learning of the correction factor K has already been completed by the previously described A/F sensor characteristic learning routine. If the learning of K has already been completed, then in step 618 the calculation $$LVAF \leftarrow LVAF*K$$

is performed to correct the response curve length LVAF of the A/F sensor output voltage by using the output characteristic correction factor K. In the next step 620, a deterioration determination reference value $L_{ref}$ is determined according to the value of LVAF. The reference value $L_{ref}$ is such a value that increases as LVAF increases (see FIG. 4).

Next, in step 622, it is determined whether or not the response curve length LVOS of the $O_2$ sensor output is equal to or larger than the deterioration determination reference value $L_{ref}$. If LVOS≧$L_{ref}$, it is determined that the catalyst is deteriorated, and a designated alarm flag ALMCC is set to 1 (step 624), while at the same time, the alarm lamp 68 (see FIG. 5) is turned on (step 624). If LVOS<$L_{ref}$, it is determined that the catalyst is not deteriorated, and the alarm flag ALMCC is set to 0 (step 628). The alarm flag ALMCC is stored in the backup RAM 79 (step 630) so that it can be recovered at the time of repair or inspection. In the final step 632, CTIME, LVAF, and LVOS are cleared to prepare for the next execution of the catalyst deterioration judging process.

Next, a description will be given of a second embodiment which improves on the first embodiment. In the second embodiment, the A/F sensor characteristic learning routine (FIGS. 12A and 12B) and the catalyst deterioration detection routine (FIGS. 17A and 17B) are modified and combined into a single routine called the A/F sensor characteristic learning and catalyst deterioration detection routine. The other routines are the same as those in the first embodiment. In the first embodiment, the output characteristic correction factor K was calculated based on the amplitude VP and period CPER. In contrast, in the second embodiment, the response curve length LVAF of the output voltage VAF of the A/F sensor 45 and an area AVAF enclosed by VAF and target voltage VAFT are calculated, and the output characteristic correction factor K for the A/F sensor 45 is obtained based on the relationship between the response curve length LVAF and the area AVAF. This enables the monitoring process for the judgement of catalyst deterioration to be combined with the monitoring process for A/F sensor characteristic learning, and thus has the effect of simplifying the overall process. First, the principle of the second embodiment will be described.

Figure 18A:
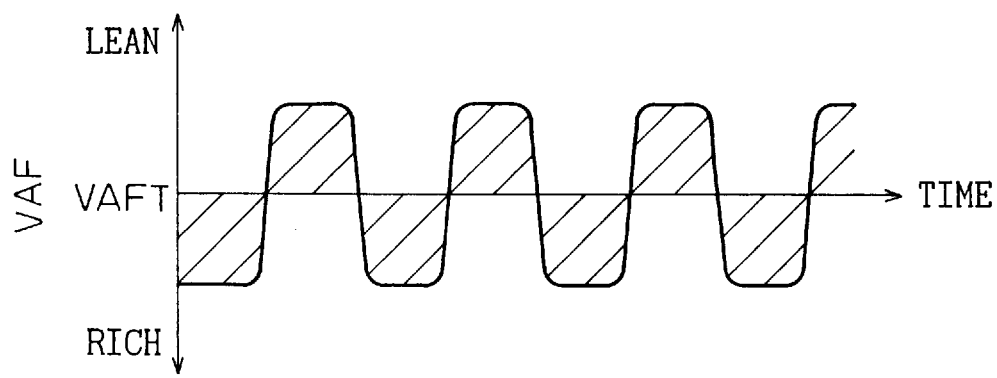
FIGS. 18A and 18B are waveform diagrams (part 1) for explaining the principle of A/F sensor characteristic learning based on the relationship between response curve length and area.
Figure 18B:
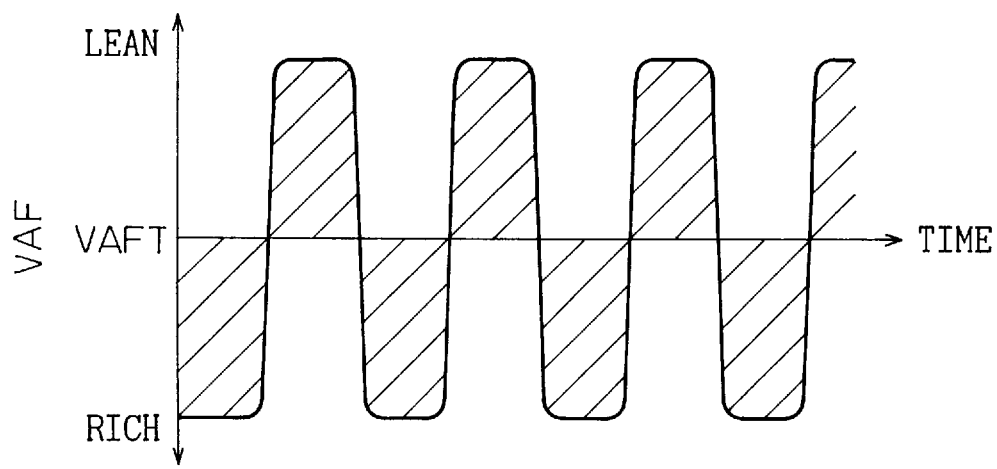
Figure 19A:
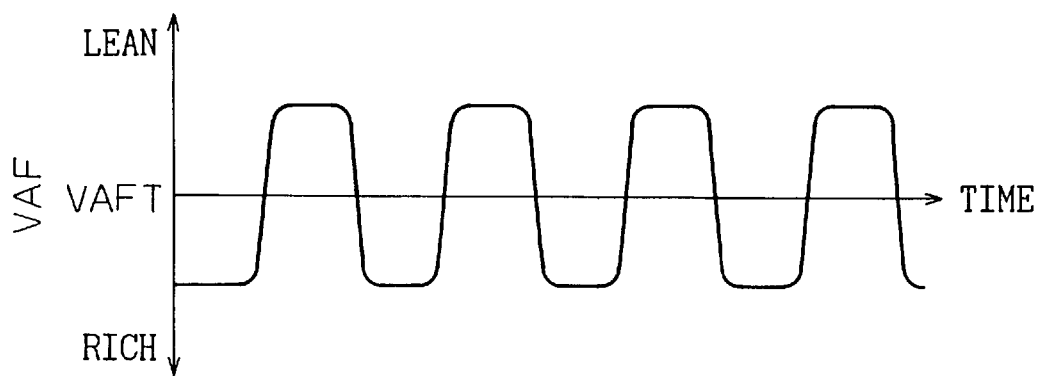
FIGS. 19A and 19B are waveform diagrams (part 2) for explaining the principle of A/F sensor characteristic learning based on the relationship between response curve length and area.
Figure 19B:
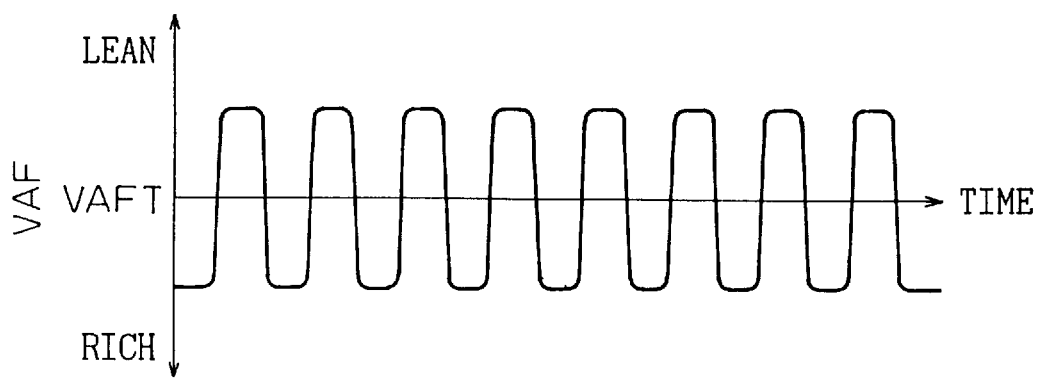

As shown in FIGS. 18A and 18B, when the cycle period is the same, it can be seen that the area AVAF (indicated by oblique hatching) enclosed by the output voltage VAF and target voltage VAFT over a prescribed time is substantially proportional to the amplitude. Further, as shown in FIGS. 19A and 19B, when the amplitude is the same, it is seen that the response curve length LVAF of the output voltage VAF over a prescribed time is substantially proportional to the frequency (or inversely proportional to the cycle). Therefore, to estimate the output characteristic of the A/F sensor, the response curve length LVAF and the area AVAF can be used instead of the amplitude VP and period CPER used in the first embodiment.

Figure 20:
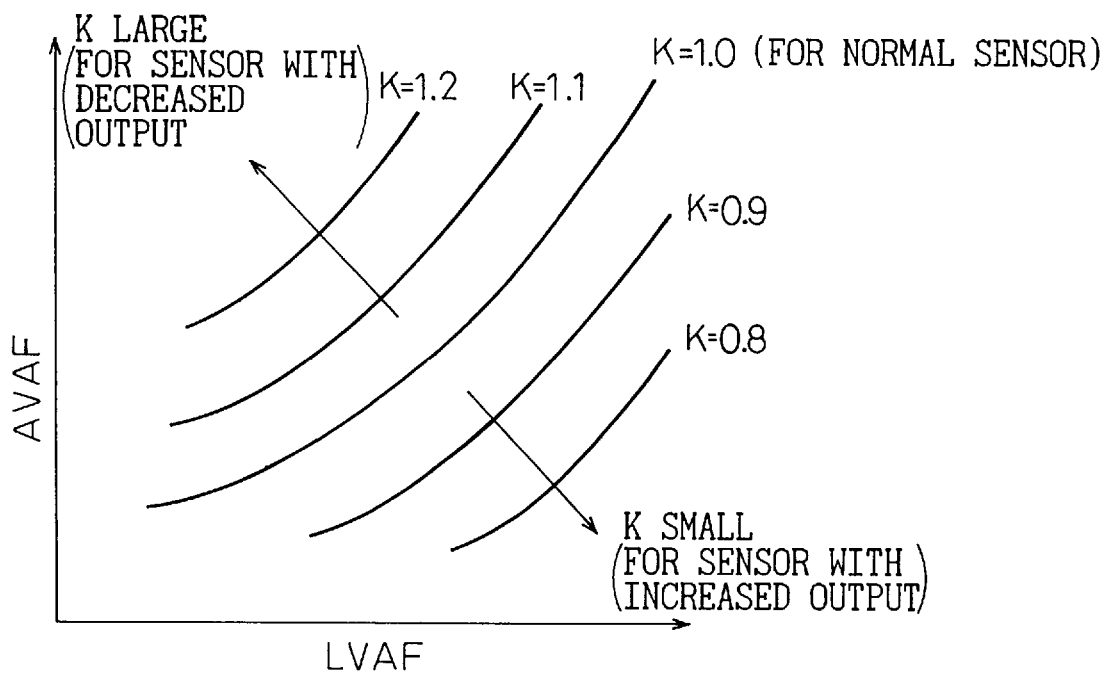
FIG. 20 is a diagram illustrating a map used to obtain the A/F sensor output characteristic correction factor K on the basis of the response curve length LVAF and area AVAF.

More specifically, in the second embodiment, the A/F sensor output voltage VAF is monitored, and the response curve length LVAF of the output and the area AVAF are calculated; then, based on the relationship between them, the correction factor K for correcting the output characteristic of the A/F sensor is obtained. FIG. 20 is a diagram illustrating a map used to obtain the A/F sensor output characteristic correction factor K based on the response curve length LVAF and area AVAF. As shown in the figure, for a given area AVAF, since the deviation of the characteristic in the output increasing direction becomes greater as the response curve length LVAF becomes larger relative to the normal value, the correction factor K is set to a value smaller than 1.0. On the other hand, for a given area AVAF, since the deviation of the characteristic in the output decreasing direction becomes greater as the response curve length LVAF becomes smaller relative to the normal value, the correction factor K is set to a value larger than 1.0.

Figure 21B:
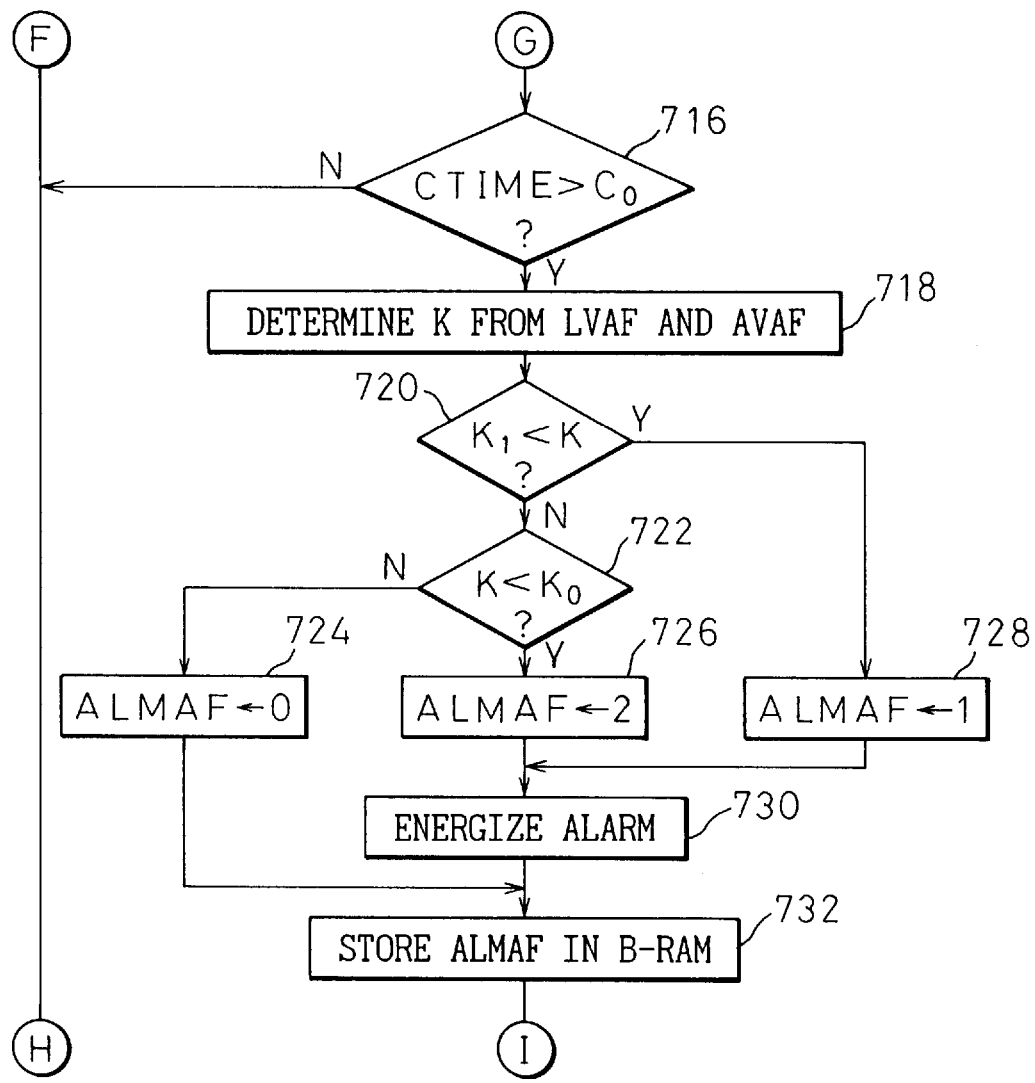
Figure 21C:
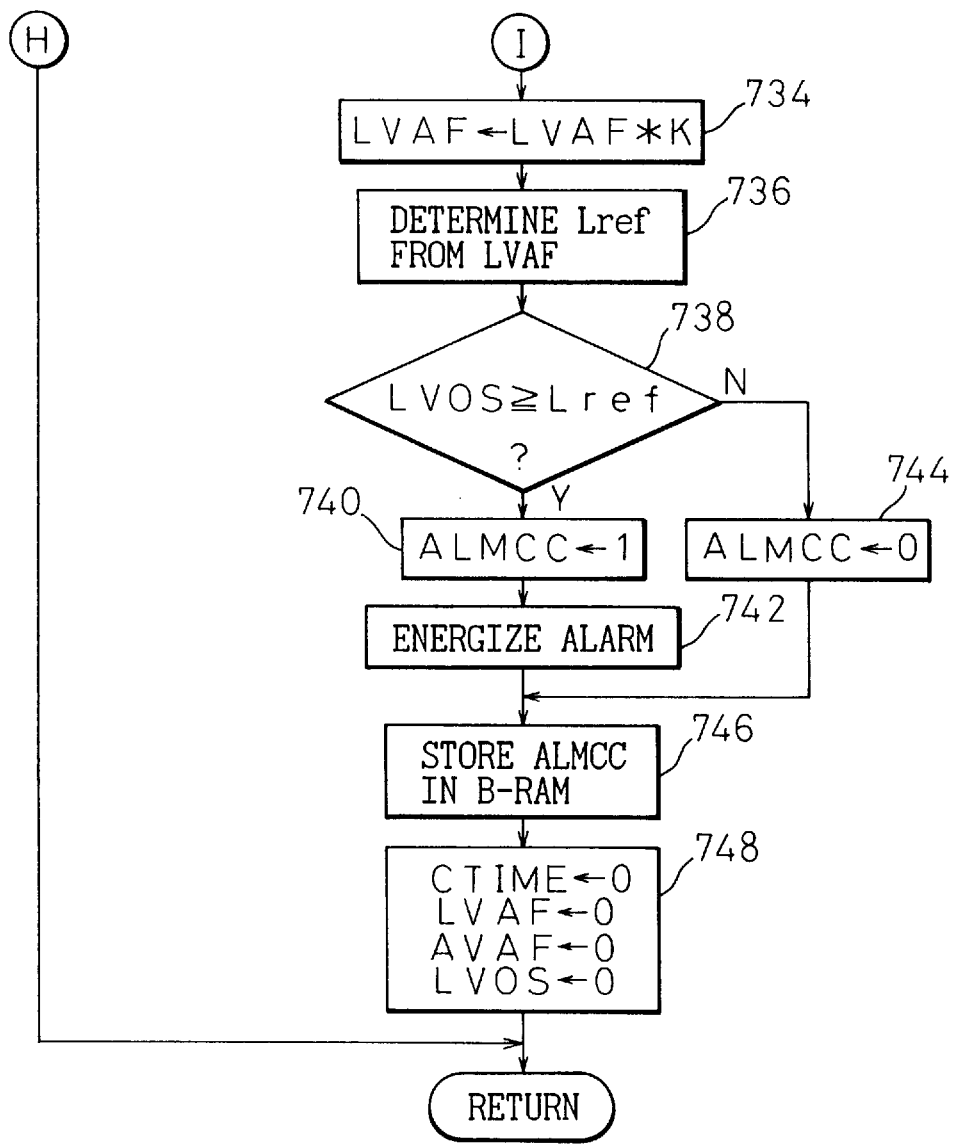

The A/F sensor characteristic learning and catalyst deterioration detection routine of the second embodiment based on the above principle is shown in flowchart form in FIGS. 21A, 21B, and 21C. This routine is executed at prescribed intervals of time. First, in step 702, it is determined whether or not the monitor condition for the judgement of catalyst deterioration is satisfied. If the monitor condition is not satisfied, the routine is terminated; if the monitor condition is satisfied, the process proceeds to step 704 and on to subsequent steps. In step 704, the output voltage VAF of the A/F sensor 45 and the output voltage VOS of the $O_2$ sensor 46 are detected.

Next, in step 706, the response curve length LVAF of VAF is updated as $$LVAF \leftarrow LVAF + |VAF-VAFO|$$

In the next step 708, the area AVAF enclosed by VAF and VAFT is updated as $$AVAF \leftarrow AVAF + |VAF-VAFT|$$

Figure 22:
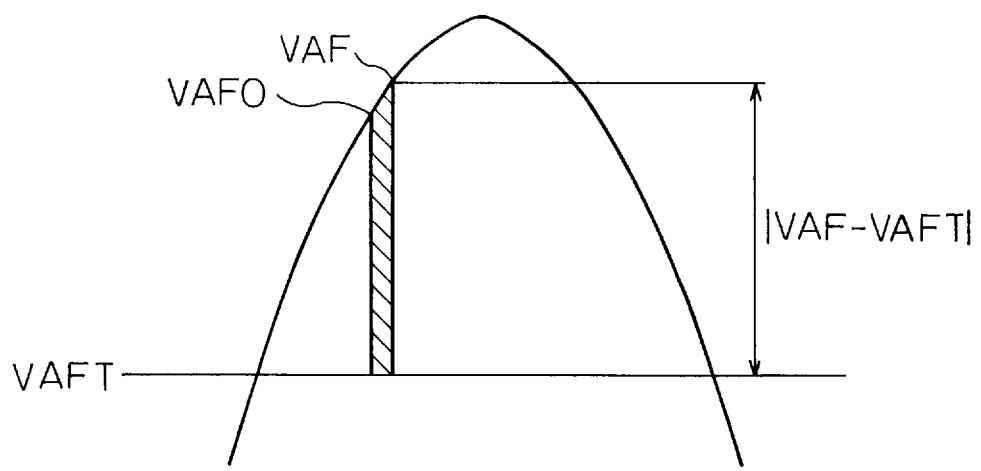
FIG. 22 is a diagram for explaining a method of calculating the area AVAF.

The calculation of the area is an approximation, as shown in FIG. 22. In the next step 710, the response curve length LVOS of VOS is updated as $$LVOS \leftarrow LVOS + |VOS-VOSO|$$

Next, in step 712, $$VAFO \leftarrow VAF$$

$$VOSO \leftarrow VOS$$

to prepare for the next execution of the routine.

Next, in step 714, the counter CTIME for measuring monitor time is incremented, and in step 716, it is determined whether or not the counter value has exceeded predetermined value $C_0$. If CTIME>$C_0$, the process proceeds to step 718, but if CTIME$\leq C_0$, the routine is terminated. In step 718, the correction factor K is obtained by referring to the map of FIG. 20 based on the response curve length LVAF and area AVAF. This map is prestored in the ROM 73.

Next, in step 720, it is determined whether or not the correction factor K is larger than a fault determination upper-limit reference value $K_1$. If $K_1$<K, it is determined that a fault condition has occurred (output deteriorated), and the designated alarm flag ALMAF is set to 1 (step 728), while at the same time, the alarm lamp 68 (see FIG. 5) is turned on (step 730). In step 722, it is determined whether or not the correction factor K is smaller than a fault determination lower-limit reference value $K_0$. If K<$K_0$, it is determined that a fault condition has occurred (an out-of-range condition), and the designated alarm flag ALMAF is set to 2 (step 726), while at the same time, the alarm lamp 68 is turned on (step 730). On the other hand, if $K_0 \leq K \leq K_1$, it is determined that the condition is normal, and the alarm flag ALMAF is set to 0 (step 724). The alarm flag ALMAF is stored in the backup RAM 79 (step 732) so that it can be recovered at the time of repair or inspection.

Next, in step 734, the calculation $$LVAF \leftarrow LVAF*K$$

is performed to correct the response curve length LVAF of the A/F sensor output voltage by using the output characteristic correction factor K. In the next step 736, a deterioration determination reference value $L_{ref}$ is determined according to the value of LVAF. The reference value $L_{ref}$ is such a value that it increases as LVAF increases.

Next, in step 736, it is determined whether or not the response curve length LVOS of the $O_2$ sensor output is equal to or larger than the deterioration determination reference value $L_{ref}$. If LVOS$\geq L_{ref}$, it is determined that the catalyst is deteriorated, and the designated alarm flag ALMCC is set to 1 (step 740), while at the same time, the alarm lamp 68 (see FIG. 5) is turned on (step 742). If LVOS<$L_{ref}$, it is determined that the catalyst is not deteriorated, and the alarm flag ALMCC is set to 0 (step 744). The alarm flag ALMCC is stored in the backup RAM 79 (step 746) so that it can be recovered at the time of repair or inspection. In the final step 748, CTIME, LVAF, AVAF, and LVOS are cleared to prepare for the next execution of the judging process.

Finally, a description will be given of a third embodiment which improves on the second embodiment. In the second embodiment described above, a fault condition of the A/F sensor was judged based on the area AVAF and the response curve length LVAF that the A/F sensor output VAF describes, by considering the fact that the main air-fuel ratio feedback correction amount is dependent on the A/F sensor output. However, when the sub air-fuel ratio feedback control based on the $O_2$ sensor output is in progress, if the degree of catalyst deterioration or the degree of $O_2$ sensor deterioration is large, an adverse effect may be caused to the A/F sensor fault determination for reasons explained below.

Figure 23A:
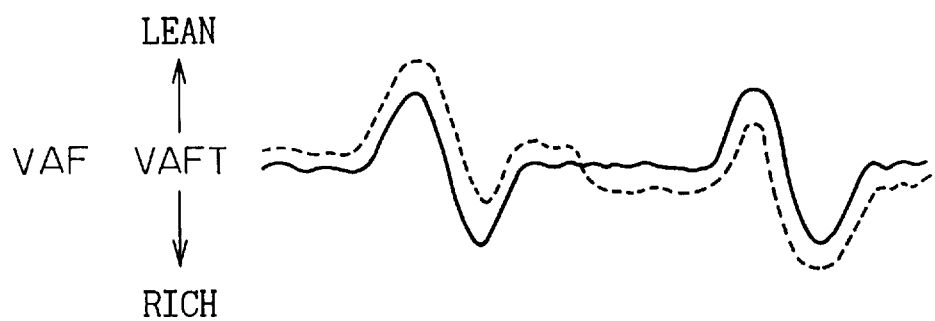
FIGS. 23A and 23B are diagrams for explaining sub air-fuel ratio feedback control.
Figure 23B:
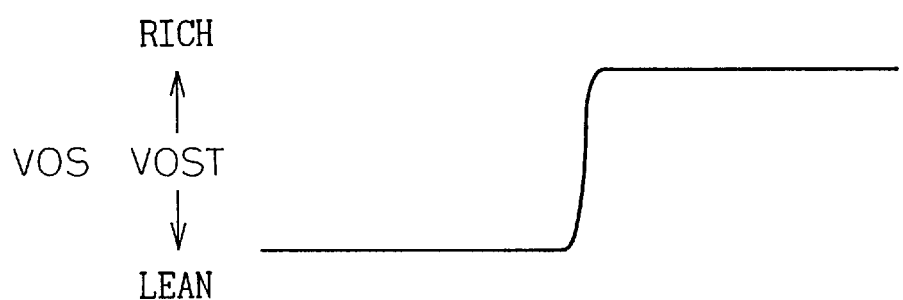

During the sub air-fuel ratio feedback control, the output of the A/F sensor is corrected based on the output of the $O_2$ sensor, and the main air-fuel ratio feedback correction amount is determined by the thus corrected A/F sensor output, as previously described. That is, when the $O_2$ sensor output voltage VOS indicates a lean state, as shown in FIG. 23B, the A/F sensor output voltage VAF is apparently corrected toward the lean side as indicated by a dashed line in FIG. 23A, thus deliberately increasing the main air-fuel ratio feedback amount to bring the air-fuel ratio back toward the rich side. On the other hand, when the $O_2$ sensor output voltage VOS indicates a rich state, the A/F sensor output voltage VAF is apparently corrected toward the rich side, thus deliberately increasing the main air-fuel ratio feedback amount to bring the air-fuel ratio back toward the lean side.

Figure 24:
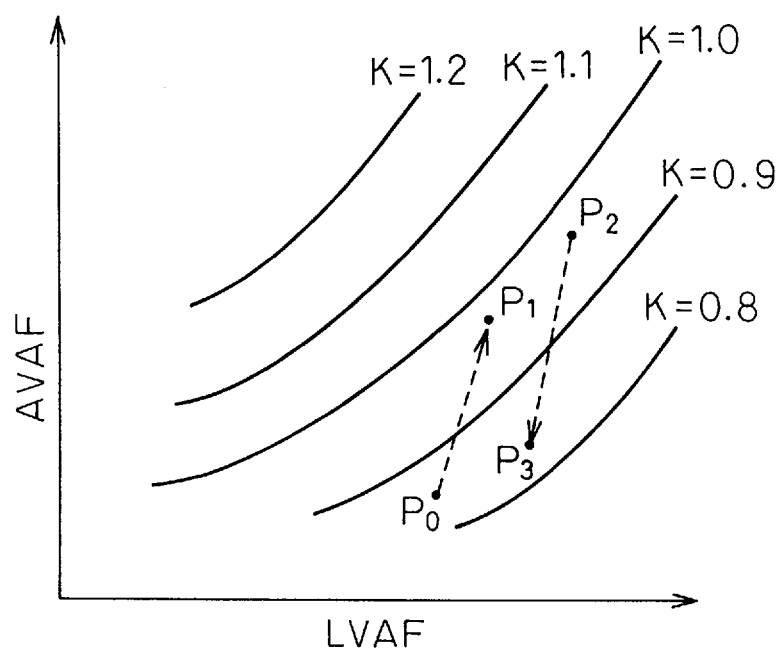
FIG. 24 is a diagram for explaining how the value of K becomes displaced because of catalyst deterioration or $O_2$ sensor deterioration.
Figure 25A:
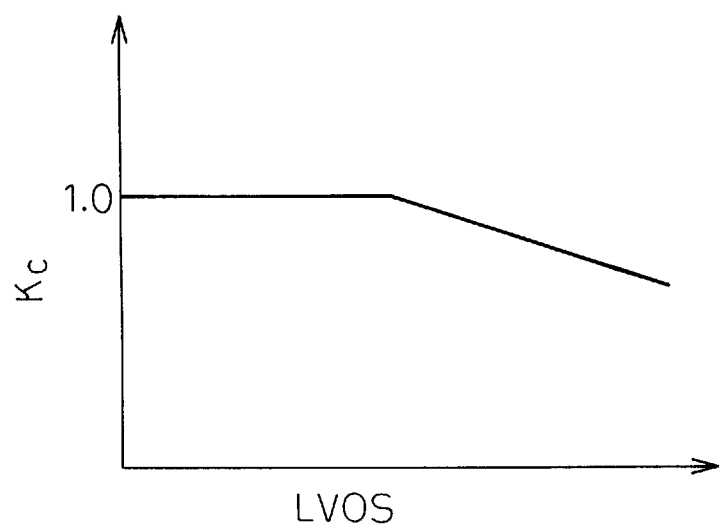
FIG. 25A is a diagram showing a map on which correction factor Kc for correcting K according to the degree of catalyst deterioration is set as a function of response curve length LVOS associated with $O_2$ sensor output.

However, as the catalyst deteriorates, the A/F variation of the gas exiting the catalyst increasingly shows a tendency to equate with the A/F variation of the gas entering the catalyst, which causes the output of the $O_2$ sensor to swing rapidly. When this happens, the sub air-fuel ratio feedback correction amount becomes excessively large, resulting in increased A/F perturbations. As A/F perturbations become large, the area AVAF and the response curve length LVAF that the A/F sensor output voltage VAF describes both increase. In fact, it has been found that a point specified on the map (FIG. 20) for obtaining the A/F sensor output characteristic correction factor K shifts in such a direction as to increase the value of K, such as the shift from point $P_0$ to $P_1$ shown in FIG. 24. Accordingly, it is desirable that a correction be made to reduce the value of K when the degree of catalyst deterioration is large. The deterioration of the catalyst also results in an increase in the response curve length LVOS of the $O_2$ sensor output voltage VOS. One possible approach to addressing this problem is to correct K by obtaining a catalyst deterioration correction factor Kc using a map such as that shown in FIG. 25A.

Figure 25B:
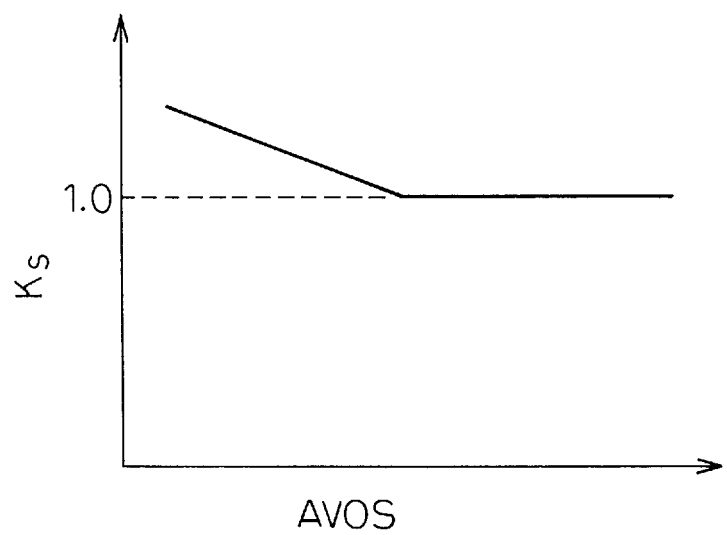
FIG. 25B is a diagram showing a map on which correction factor Ks for correcting K according to the degree of $O_2$ sensor deterioration is set as a function of area AVOS associated with $O_2$ sensor output.

On the other hand, as the $O_2$ sensor deteriorates, the output swing of the $O_2$ sensor becomes small. This decreases the sub air-fuel ratio feedback correction amount, which in turn reduces the amplitude of the A/F sensor. As a result, the area AVAF and the response curve length LVAF that the A/F sensor output voltage VAF describes both decreases. In fact, it has been found that a point specified on the map (FIG. 20) for obtaining the A/F sensor output characteristic correction factor K shifts in such a direction as to decrease the value of K, such as the shift from point $P_2$ to $P_3$ shown in FIG. 24. Accordingly, it is desirable that a correction be made to increase the value of K when the degree of $O_2$ sensor deterioration is large. That the deterioration of the $O_2$ sensor leads to decreasing the output swing of the $O_2$ sensor also means that the area AVOS enclosed by the $O_2$ sensor output voltage VOS and its target voltage VOST decreases. One possible approach to addressing this problem is to correct K by obtaining an $O_2$ sensor deterioration correction factor Ks using a map such as shown in FIG. 25B.

Figure 26A:
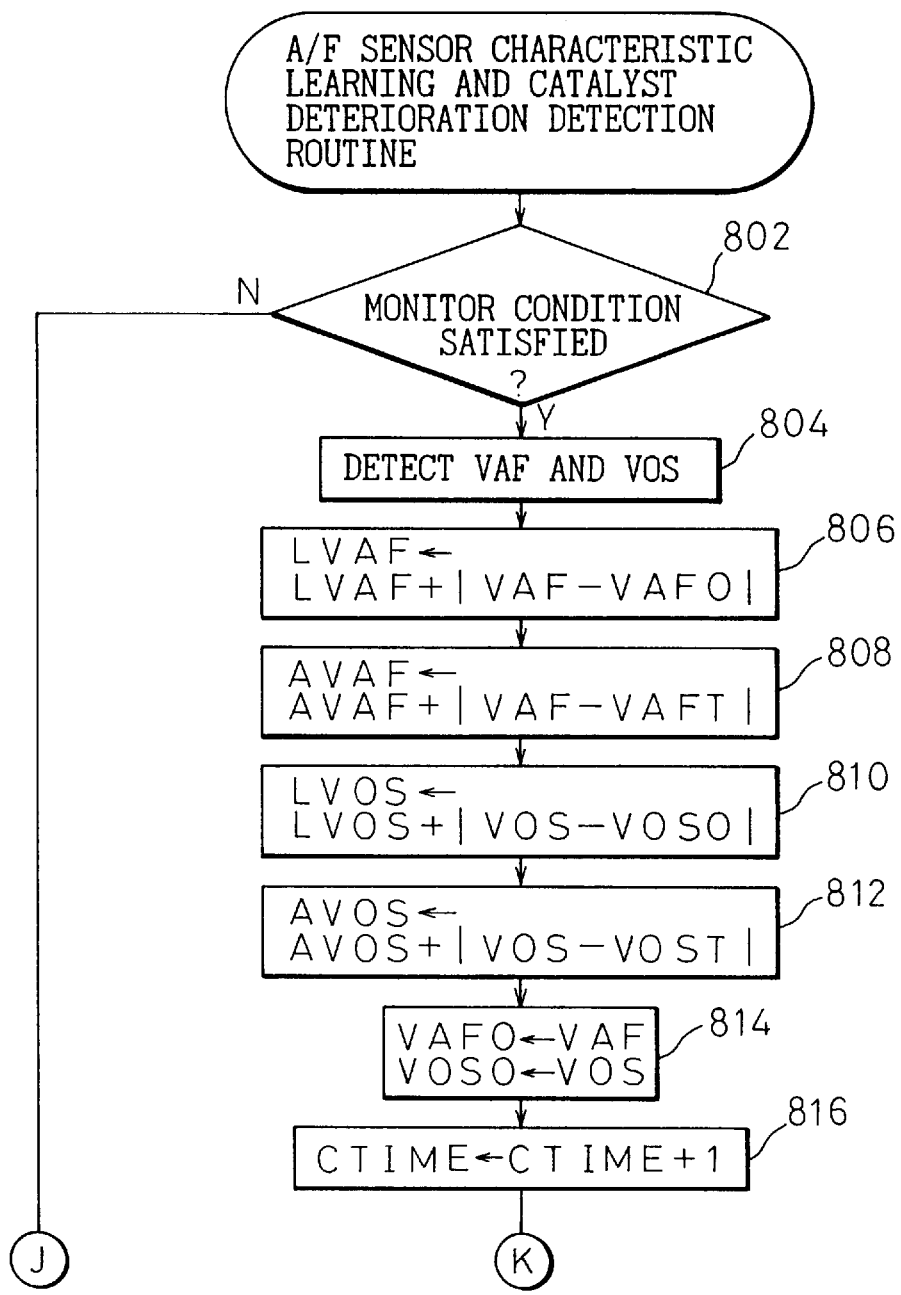
Figure 26C:
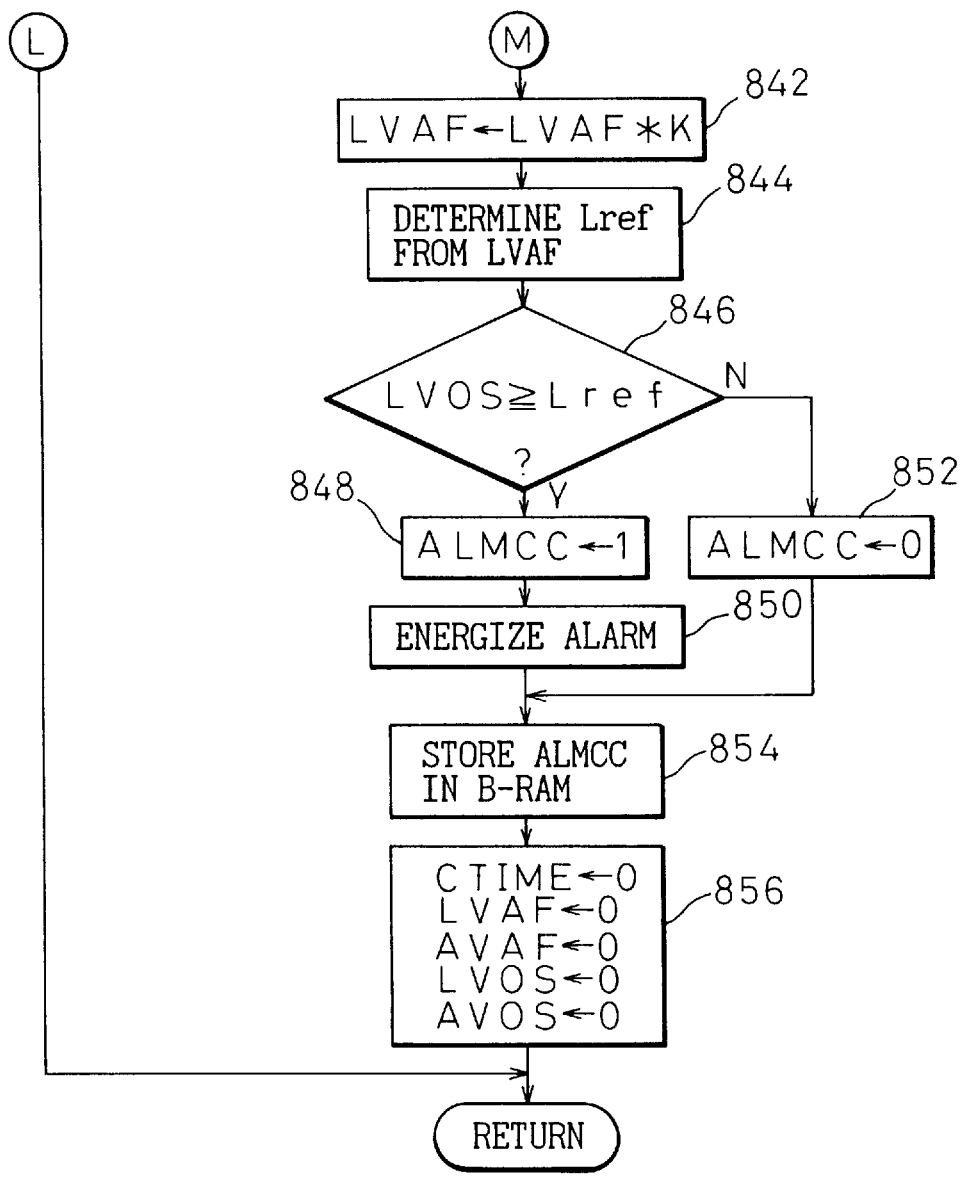

FIGS. 26A, 26B, and 26C show a flowchart illustrating a processing sequence for the A/F sensor characteristic learning and catalyst deterioration detection routine of the third embodiment based on the above principle. Differences between the third embodiment and the second embodiment will be described below. First, in the third embodiment, in addition to the response curve length LVAF and area AVAF, which the output voltage VAF of the A/F sensor 45 describes, and the response curve length LVOS, which the output voltage VOS of the $O_2$ sensor 46 describes, the area AVOS enclosed by the VOS and the target $O_2$ sensor output voltage VOST is obtained by the following calculation (step 812).

$$AVOS \leftarrow AVOS + |VOS - VOST|$$

Then, following the step 820 where the A/F sensor output characteristic correction factor (A/F sensor deterioration degree judgement value) K is obtained based on LVAF and AVAF, steps 822, 824, and 826 are added to correct K in accordance with the degree of catalyst deterioration and the degree of $O_2$ sensor deterioration. That is, in step 822, the catalyst deterioration correction factor Kc that matches the response curve length LVOS of the $O_2$ sensor output voltage is obtained by referring to the map shown in FIG. 25A. Then, in step 824, the $O_2$ sensor deterioration correction factor Ks that matches the area AVOS associated with the $O_2$ sensor output voltage VOS is obtained by referring to the map shown in FIG. 25B. These maps are prestored in the ROM 73. Next, in step 826, K is corrected by the calculation $$K \leftarrow K*Kc*Ks$$

The processing thereafter is performed in the same manner as described in the second embodiment, by using the corrected K. It will also be recognized that the correction may be made based on one or the other of the two factors, catalyst deterioration or $O_2$ sensor deterioration, as necessary.

The present invention has been described with reference to the preferred embodiments, but it will be appreciated that the invention is not limited to the illustrated embodiments. For example, in the above embodiments, an $O_2$ sensor exhibiting a Z-shaped output characteristic against the oxygen concentration in the exhaust gas is mounted on the downstream side of the catalyst, but in place of that, an air-fuel ratio sensor (A/F sensor) having an output characteristic substantially proportional to the oxygen concentration in the exhaust gas, such as the one located on the upstream side of the catalyst, may also be mounted on the downstream side of the catalyst.

As described above, according to the present invention, in an air-fuel ratio control apparatus for an internal combustion engine in which an A/F sensor having an output characteristic substantially proportional to the oxygen concentration in the exhaust gas is mounted on the upstream side of an exhaust gas purifying catalyst, and in which feedback control is performed to bring the air-fuel ratio to the target air-fuel ratio on the basis of the difference between the air-fuel ratio represented by the output of the A/F sensor and the target air-fuel ratio, a deviation in the characteristic of the A/F sensor is estimated and the air-fuel ratio feedback control and catalyst deterioration judging processes accounting for the estimated deviation are performed, while at the same time, the characteristic deviation or deterioration of the A/F sensor is judged. In this way, the present invention further improves the exhaust gas purification performance by improving the accuracy of air-fuel ratio control, and thereby contributes greatly to the prevention of air pollution.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description and all changes which come within the meaning and range of equivalency of the claims are therefore intended to be embraced therein.

What is claimed is:

1. An air-fuel ratio control apparatus for an internal combustion engine, comprising:

an exhaust gas purifying catalyst mounted in an exhaust passage of said internal combustion engine;

an air-fuel ratio sensor mounted upstream of said exhaust gas purifying catalyst and having an output characteristic substantially proportional to an oxygen concentration in an exhaust gas;

air-fuel ratio feedback control means for performing feedback control so as to bring an air-fuel ratio to a target air-fuel ratio on the basis of a difference between an output of said air-fuel ratio sensor and a target output corresponding to said target air-fuel ratio; and sensor output correcting means for calculating an amplitude of the output of said air-fuel ratio sensor, measured in reference to said target output, and a period from the time the output of said air-fuel ratio sensor crosses said target output to the time said output returns to said target output, each time an inversion occurs in the output of said air-fuel ratio sensor with respect to said target output during the air-fuel ratio feedback control being performed by said air-fuel ratio feedback control means, and for correcting the output of said air-fuel ratio sensor on the basis of said amplitude and said period.

2. An air-fuel ratio control apparatus for an internal combustion engine, comprising:

an exhaust gas purifying catalyst mounted in an exhaust passage of said internal combustion engine;

an air-fuel ratio sensor mounted upstream of said exhaust gas purifying catalyst and having an output characteristic substantially proportional to an oxygen concentration in an exhaust gas;

air-fuel ratio feedback control means for performing feedback control so as to bring an air-fuel ratio to a target air-fuel ratio on the basis of a difference between an output of said air-fuel ratio sensor and a target output corresponding to said target air-fuel ratio; and sensor fault judging means for calculating an amplitude of the output of said air-fuel ratio sensor, measured in reference to said target output, and a period from the time the output of said air-fuel ratio sensor crosses said target output to the time said output returns to said target output, each time an inversion occurs in the output of said air-fuel ratio sensor with respect to said target output during the air-fuel ratio feedback control being performed by said air-fuel ratio feedback control means, and for judging a deviation or deterioration in the characteristic of said air-fuel ratio sensor on the basis of said amplitude and said period.

3. An air-fuel ratio control apparatus for an internal combustion engine, comprising:

an exhaust gas purifying catalyst mounted in an exhaust passage of said internal combustion engine;

an upstream air-fuel ratio sensor mounted upstream of said exhaust gas purifying catalyst and having an output characteristic substantially proportional to an oxygen concentration in an exhaust gas;

air-fuel ratio feedback control means for performing feedback control so as to bring an air-fuel ratio to a target air-fuel ratio on the basis of a difference between an output of said upstream air-fuel ratio sensor and a target output corresponding to said target air-fuel ratio;

a downstream air-fuel ratio sensor mounted downstream of said exhaust gas purifying catalyst;

catalyst deterioration judging means for judging deterioration of said exhaust gas purifying catalyst on the basis of the lengths of response curves that the outputs of said upstream air-fuel ratio sensor and said downstream air-fuel ratio sensor respectively describe for a prescribed period during the air-fuel ratio feedback control being performed by said air-fuel ratio feedback control means; and response curve length correcting means for calculating an amplitude of the output of said upstream air-fuel ratio sensor, measured in reference to said target output, and a period from the time the output of said upstream air-fuel ratio sensor crosses said target output to the time said output returns to said target output, each time an inversion occurs in the output of said upstream air-fuel ratio sensor with respect to said target output during the air-fuel ratio feedback control being performed by said air-fuel ratio feedback control means, and for correcting on the basis of said amplitude and said period the output response curve length of said upstream air-fuel ratio sensor calculated by said catalyst deterioration judging means.

4. An air-fuel ratio control apparatus for an internal combustion engine, comprising:

an exhaust gas purifying catalyst mounted in an exhaust passage of said internal combustion engine;

an air-fuel ratio sensor mounted upstream of said exhaust gas purifying catalyst and having an output characteristic substantially proportional to an oxygen concentration in an exhaust gas;

air-fuel ratio feedback control means for performing feedback control so as to bring an air-fuel ratio to a target air-fuel ratio on the basis of a difference between an output of said air-fuel ratio sensor and a target output corresponding to said target air-fuel ratio; and sensor output correcting means for calculating an output response curve length of said air-fuel ratio sensor and an area enclosed by the output of said air-fuel ratio sensor and said target output for a prescribed period during the air-fuel ratio feedback control being performed by said air-fuel ratio feedback control means, and for correcting the output of said air-fuel ratio sensor on the basis of said response curve length and said area.

5. An air-fuel ratio control apparatus for an internal combustion engine, comprising:

an exhaust gas purifying catalyst mounted in an exhaust passage of said internal combustion engine;

an air-fuel ratio sensor mounted upstream of said exhaust gas purifying catalyst and having an output characteristic substantially proportional to an oxygen concentration in an exhaust gas;

air-fuel ratio feedback control means for performing feedback control so as to bring an air-fuel ratio to a target air-fuel ratio on the basis of a difference between an output of said air-fuel ratio sensor and a target output corresponding to said target air-fuel ratio; and sensor fault judging means for calculating an output response curve length of said air-fuel ratio sensor and an area enclosed by the output of said air-fuel ratio sensor and said target output for a prescribed period during the air-fuel ratio feedback control being performed by said air-fuel ratio feedback control means, and for judging a deviation or deterioration in the characteristic of said air-fuel ratio sensor on the basis of said response curve length and said area.

6. An air-fuel ratio control apparatus for an internal combustion engine, comprising:

an exhaust gas purifying catalyst mounted in an exhaust passage of said internal combustion engine;

an upstream air-fuel ratio sensor mounted upstream of said exhaust gas purifying catalyst and having an output characteristic substantially proportional to an oxygen concentration in an exhaust gas;

first air-fuel ratio feedback control means for performing feedback control so as to bring an air-fuel ratio to a target air-fuel ratio on the basis of a difference between an output of said upstream air-fuel ratio sensor and an upstream air-fuel ratio sensor target output corresponding to said target air-fuel ratio;

a downstream air-fuel ratio sensor mounted downstream of said exhaust gas purifying catalyst;

second air-fuel ratio feedback control means for correcting the output of said upstream air-fuel ratio sensor on the basis of a difference between an output of said downstream air-fuel ratio sensor and a downstream air-fuel ratio sensor target output; and sensor fault judging means for calculating an upstream response curve length that the output of said upstream air-fuel ratio sensor describes, an upstream area enclosed by the output of said upstream air-fuel ratio sensor and said upstream air-fuel ratio sensor target output, and at least either a downstream response curve length that the output of said downstream air-fuel ratio sensor describes or a downstream area enclosed by the output of said downstream air-fuel ratio sensor and said downstream air-fuel ratio sensor target output, for a prescribed period during the air-fuel ratio feedback control being performed by said first and said second air-fuel ratio feedback control means, and for judging a deviation or deterioration in the characteristic of said upstream air-fuel sensor on the basis of said upstream response curve length, said upstream area, and at least either said downstream response curve length or said downstream area.

7. An air-fuel ratio control apparatus for an internal combustion engine, comprising:

an exhaust gas purifying catalyst mounted in an exhaust passage of said internal combustion engine;

an upstream air-fuel ratio sensor mounted upstream of said exhaust gas purifying catalyst and having an output characteristic substantially proportional to an oxygen concentration in an exhaust gas;

air-fuel ratio feedback control means for performing feedback control so as to bring an air-fuel ratio to a target air-fuel ratio on the basis of a difference between an output of said upstream air-fuel ratio sensor and a target output corresponding to said target air-fuel ratio;

a downstream air-fuel ratio sensor mounted downstream of said exhaust gas purifying catalyst; and catalyst deterioration judging means for calculating an output response curve length of said upstream air-fuel ratio sensor, an output response curve length of said downstream air-fuel ratio sensor, and an area enclosed by the output of said upstream air-fuel ratio sensor and said target output, for a prescribed period during the air-fuel ratio feedback control being performed by said air-fuel ratio feedback control means, and for correcting the output response curve length of said upstream air-fuel ratio sensor on the basis of said area and the output response curve length of said upstream air-fuel ratio sensor, and judging deterioration of said exhaust gas purifying catalyst on the basis of said corrected output response curve length of said upstream air-fuel ratio sensor and the output response curve length of said downstream air-fuel ratio sensor.

* * * * *